(12) United States Patent
Ono et al.

(10) Patent No.: US 11,390,930 B2
(45) Date of Patent: Jul. 19, 2022

(54) STEEL SHEET AND MANUFACTURING METHOD THEREFOR

(71) Applicant: JFE Steel Corporation, Tokyo (JP)

(72) Inventors: Yoshihiko Ono, Tokyo (JP); Junya Tobata, Tokyo (JP); Hiroyuki Akimoto, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 199 days.

(21) Appl. No.: 16/604,398

(22) PCT Filed: Apr. 13, 2018

(86) PCT No.: PCT/JP2018/015509
§ 371 (c)(1),
(2) Date: Oct. 10, 2019

(87) PCT Pub. No.: WO2018/190416
PCT Pub. Date: Oct. 18, 2018

(65) Prior Publication Data
US 2020/0157647 A1 May 21, 2020

(30) Foreign Application Priority Data

Apr. 14, 2017 (JP) .............................. JP2017-080193
Dec. 7, 2017 (WO) ................... PCT/JP2017/043925

(51) Int. Cl.
B32B 15/00 (2006.01)
C21D 9/46 (2006.01)
(Continued)

(52) U.S. Cl.
CPC .............. C21D 9/46 (2013.01); C21D 6/005 (2013.01); C21D 8/0205 (2013.01);
(Continued)

(58) Field of Classification Search
CPC ........ C21D 9/46; C21D 6/005; C21D 8/0205; C21D 8/0226; C21D 8/0236;
(Continued)

(56) References Cited

U.S. PATENT DOCUMENTS 9,121,087 B2 * 9/2015 Matsuda ................. C22C 38/04
2009/0014098 A1 1/2009 Matsuda et al.
(Continued)

FOREIGN PATENT DOCUMENTS

CN 102149840 A 8/2011
CN 103080357 A 5/2013
(Continued)

OTHER PUBLICATIONS

International Search Report and Written Opinion for International Application No. PCT/JP2018/015509 dated Jul. 10, 2018, 6 Pages.
(Continued)

Primary Examiner — Seth Dumbris
(74) Attorney, Agent, or Firm — RatnerPrestia

(57) ABSTRACT

A steel sheet and a manufacturing method therefor are provided. A steel sheet has a component composition and contains 6 to 80% of ferrite and 20 to 94% of a microstructure composed of one or two or more of upper bainite, fresh martensite, tempered martensite, lower bainite, and retained γ, and contains 7 to 20% of retained γ, where: an area ratio ($S_{\gamma UB}$) of retained γ having a particle width of 0.18 to 0.60 μm, a particle length of 1.7 to 7.0 μm, and an aspect ratio of 5 to 15 is 0.2 to 5%; and a total area ratio ($S_{\gamma Block}$) of fresh martensite having an equivalent circle diameter of 1.5 to 15 μm and an aspect ratio of 3 or less and/or retained γ particles having an equivalent circle diameter of 1.5 to 15 μm and an aspect ratio of 3 or less is 3% or less (including 0%).

18 Claims, 4 Drawing Sheets a; UPPER BAINITE (CONTAINING FEW CARBIDES)
b; PLATE-LIKE RETAINED γ FORMED ADJACENT TO UPPER BAINITE
  (RETAINED γ HAVING PARTICLE WIDTH OF 0.18 TO 0.60 μm, PARTICLE LENGTH OF 1.7 TO 7.0 μm, AND ASPECT RATIO OF 5 TO 15)
c; TEMPERED MARTENSITE
d; FILM-LIKE RETAINED γ OR FRESH MARTENSITE FORMED ADJACENT TO TEMPERED MARTENSITE
e; CARBIDES FORMED INSIDE TEMPERED MARTENSITE
f; LOWER BAINITE
g; FILM-LIKE RETAINED γ OR FRESH MARTENSITE FORMED ADJACENT TO LOWER BAINITE
h; BLOCKY FRESH MARTENSITE OR RETAINED γ
  (FRESH MARTENSITE OR RETAINED γ PARTICLE HAVING EQUIVALENT CIRCLE DIAMETER OF 1.5 TO 15 μm AND ASPECT RATIO OF 3 OR LESS)
i; FERRITE

(51) Int. Cl.
  *C21D 6/00* (2006.01)
  *C21D 8/02* (2006.01)
  *C22C 38/00* (2006.01)
  *C22C 38/02* (2006.01)
  *C22C 38/04* (2006.01)
  *C22C 38/06* (2006.01)
  *C22C 38/08* (2006.01)
  *C22C 38/12* (2006.01)
  *C22C 38/14* (2006.01)
  *C22C 38/16* (2006.01)
  *C22C 38/60* (2006.01)

(52) U.S. Cl.
  CPC ......... *C21D 8/0226* (2013.01); *C21D 8/0236* (2013.01); *C21D 8/0273* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/60* (2013.01); *C21D 2211/002* (2013.01); *C21D 2211/005* (2013.01); *C21D 2211/008* (2013.01)

(58) Field of Classification Search
  CPC ............ C21D 8/0273; C21D 2211/002; C21D 2211/005; C21D 2211/008; C22C 38/001; C22C 38/002; C22C 38/005; C22C 38/02; C22C 38/04; C22C 38/06; C22C 38/08; C22C 38/12; C22C 38/14; C22C 38/16; C22C 38/60; C22C 38/00
  USPC ............ 148/504, 320; 420/8, 128, 120, 103
  See application file for complete search history.

(56) References Cited

U.S. PATENT DOCUMENTS

| | | | | |
|---|---|---|---|---|
| 2011/0036465 | A1* | 2/2011 | Kawasaki | C22C 38/34 148/333 |
| 2014/0000765 | A1* | 1/2014 | Nozaki | C22C 38/14 148/504 |
| 2015/0027593 | A1* | 1/2015 | Hata | C22C 38/04 148/504 |
| 2016/0177427 | A1* | 6/2016 | Takashima | C21D 8/0236 148/603 |
| 2017/0107591 | A1* | 4/2017 | Takashima | C22C 38/001 |
| 2017/0321297 | A1* | 11/2017 | Takashima | C21D 6/008 |
| 2018/0023155 | A1* | 1/2018 | Takeda | C21D 9/46 148/548 |
| 2018/0127856 | A1* | 5/2018 | Takashima | C21D 6/008 |
| 2020/0190619 | A1* | 6/2020 | Natsumeda | C22C 38/08 |

FOREIGN PATENT DOCUMENTS

| | | | |
|---|---|---|---|
| CN | 104364407 | A | 2/2015 |
| CN | 105102655 | A | 11/2015 |
| EP | 2243852 | A1 | 10/2010 |
| EP | 2325346 | A1 | 5/2011 |
| EP | 2615191 | A1 | 7/2013 |
| EP | 2692895 | A1 | 2/2014 |
| EP | 2857542 | A1 | 4/2015 |
| EP | 2980245 | A1 | 2/2016 |
| EP | 3144406 | A1 | 3/2017 |
| JP | 3854506 | B2 | 12/2006 |
| JP | 2007009320 | A | 1/2007 |
| JP | 3881559 | B2 | 2/2007 |
| JP | 2009209451 | A | 9/2009 |
| JP | 4411221 | B2 | 2/2010 |
| JP | 2013072101 | A | 4/2013 |
| JP | 5463685 | B2 | 4/2014 |
| JP | 2017214648 | A * | 12/2017 ............ C22C 38/00 |
| KR | 20130123460 | A | 11/2013 |

OTHER PUBLICATIONS

Extended European Search Report for European Application No. 18 784 256.2, dated Jan. 28, 2020, 7 pages.
Korean Grant of Patent for Korean Application No. 10-2019-7030119, dated May 11, 2021, with translation, 2 pages.
Chinese Office Action with Search Report for Chinese Application No. 201880024914.8, dated Nov. 13, 2020, 7 pages. .

* cited by examiner

FIG. 1

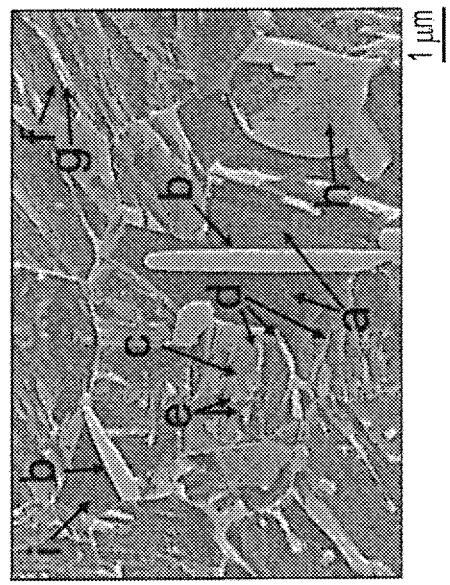

a; UPPER BAINITE (CONTAINING FEW CARBIDES)
b; PLATE-LIKE RETAINED γ FORMED ADJACENT TO UPPER BAINITE
 (RETAINED γ HAVING PARTICLE WIDTH OF 0.18 TO 0.60 μm, PARTICLE LENGTH OF 1.7 TO 7.0 μm, AND ASPECT RATIO OF 5 TO 15)
c; TEMPERED MARTENSITE
d; FILM-LIKE RETAINED γ OR FRESH MARTENSITE FORMED ADJACENT TO TEMPERED MARTENSITE
e; CARBIDES FORMED INSIDE TEMPERED MARTENSITE
f; LOWER BAINITE
g; FILM-LIKE RETAINED γ OR FRESH MARTENSITE FORMED ADJACENT TO LOWER BAINITE
h; BLOCKY FRESH MARTENSITE OR RETAINED γ
 (FRESH MARTENSITE OR RETAINED γ PARTICLE HAVING EQUIVALENT CIRCLE DIAMETER OF 1.5 TO 15 μm AND ASPECT RATIO OF 3 OR LESS)
i; FERRITE

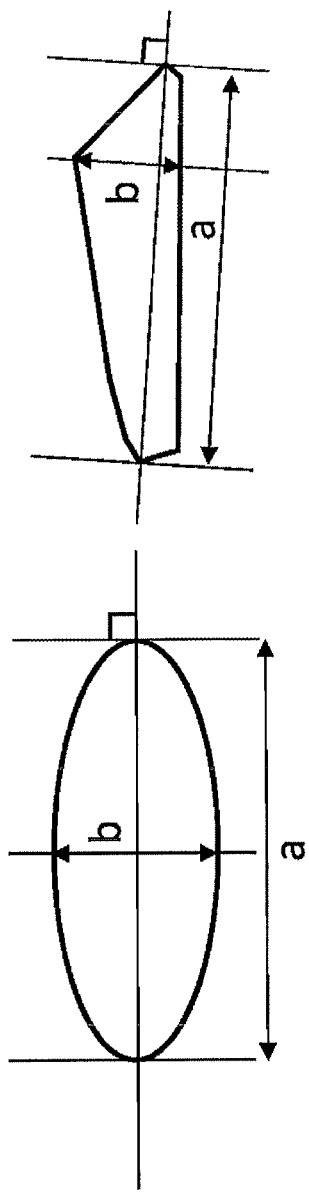

FIG. 4
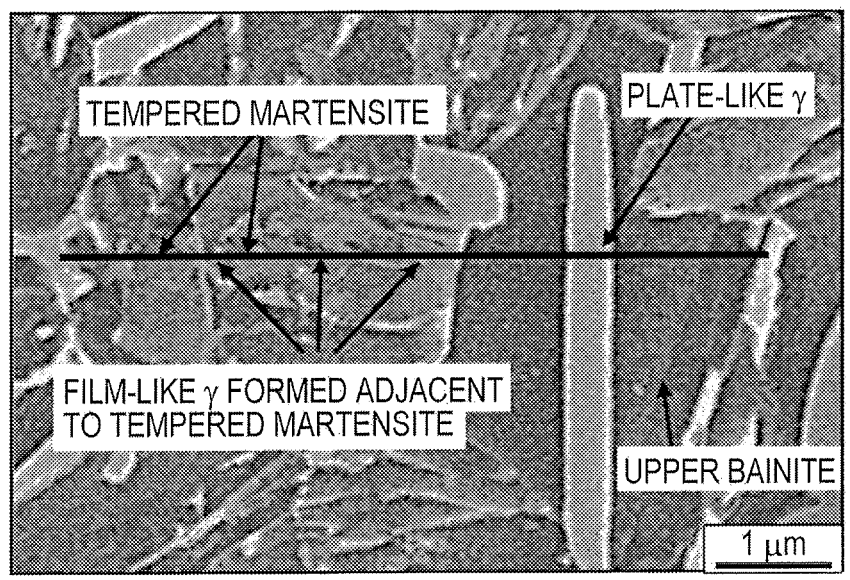
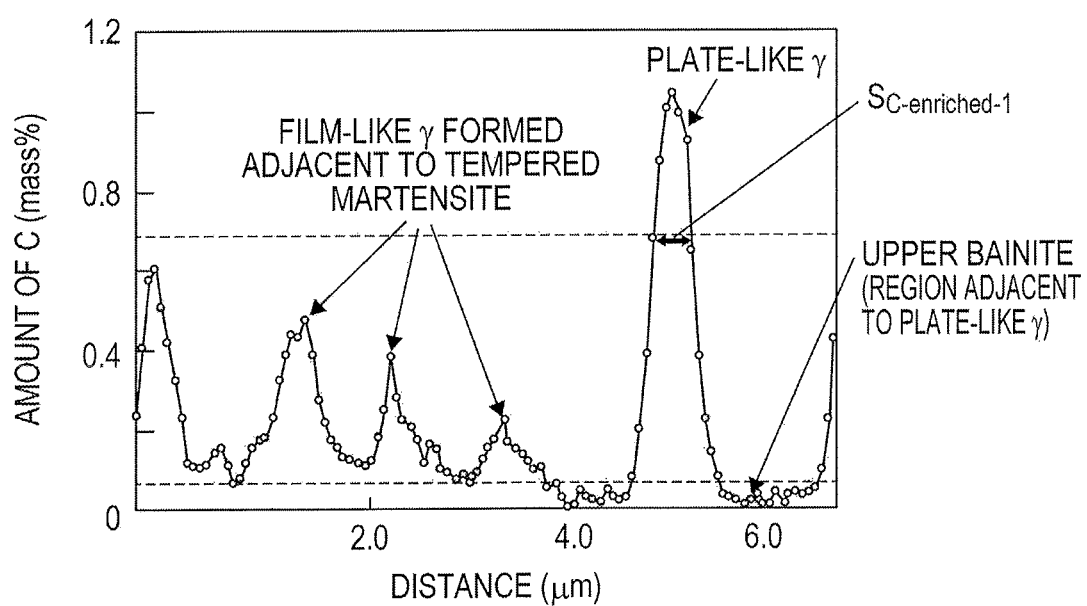

STEEL SHEET AND MANUFACTURING METHOD THEREFOR

CROSS REFERENCE TO RELATED APPLICATIONS

This is the U.S. National Phase application of PCT/JP2018/015509, filed Apr. 13, 2018, which claims priority to Japanese Patent Application No. 2017-080193, filed Apr. 14, 2017 and this is the U.S. National Phase application of PCT/JP2017/043925, filed Dec. 7, 2017, the disclosures of these applications being incorporated herein by reference in their entireties for all purposes.

FIELD OF THE INVENTION

The present invention relates to a steel sheet that is suitably applicable to press forming for use in automobiles, home appliances, and the like through a press forming step and to a manufacturing method therefor.

BACKGROUND OF THE INVENTION

In response to a further increasing need for light-weight automobile bodies, more and more high-strength steel sheets of 980 to 1,180 MPa grade have been applied to automotive body parts and sheet parts in recent years. When such high-strength steel sheets of 980 to 1,180 MPa grade are applied to automotive parts, however, cracking tends to occur during pressing due to low ductility and poor stretch flangeability. Accordingly, these high-strength steel sheets are desired to have more excellent formability than ever before.

For this reason, TRIP steel, in which retained γ is dispersed in the microstructure of steel sheets, has been developed as a technical approach for enhancing the ductility of steel sheets.

Patent Literature 1, for example, discloses that a steel sheet having TS of 80 kgf/mm$^2$ or higher and high ductility of TS×El≥2,500 kgf/mm$^2$·% is obtained by annealing steel containing C: 0.10 to 0.45%, S: 0.5 to 1.8%, and Mn: 0.5 to 3.0% and subsequently holding at 350° C. to 500° C. for 1 to 30 min to form retained γ.

Patent Literature 2 discloses that a steel sheet having excellent ductility (El) and stretch flangeability (λ) is obtained by annealing steel containing C: 0.10 to 0.25%, Si: 1.0 to 2.0%, and Mn: 1.5 to 3.0%, subsequently cooling to 450° C. to 300° C. at 10° C./s or more, and holding for 180 to 600 sec, thereby controlling, in volume fraction, retained austenite to 5% or more, bainitic ferrite to 60% or more, and polygonal ferrite to 20% or less.

Patent Literature 3 discloses that high ductility and high stretch flangeability can be imparted to a steel sheet by cooling a steel sheet having a specific component composition to a temperature range of 150° C. to 350° C. after annealing, reheating to around 400° C., and holding, thereby obtaining a microstructure containing ferrite, tempered martensite, and retained austenite. This technique utilizes a principle of so-called Quenching & Partitioning (Q&P; quenching and partitioning of carbon from martensite to austenite) in which retained γ is stabilized by cooling once to a temperature range between the martensite start temperature (Ms temperature) and the martensite finish temperature (Mf temperature) in the cooling process, followed by reheating and holding. By utilizing this principle, the development of high-strength steel sheets having high ductility and high stretch flangeability has been advancing in recent years.

Patent Literature 4 discloses a technique for improving the above-mentioned Q&P process. Specifically, the technique attempts to achieve high ductility and high stretch flangeability by annealing steel having a particular component composition at a temperature of (Ae3–10° C.) or higher to control polygonal ferrite to 5% or less and then terminating cooling at a relatively high temperature of (Ms–10° C.) to (Ms–100° C.), thereby forming upper bainite upon reheating to around 400° C.

Further, Patent Literature 5 discloses a technique of obtaining a steel sheet having excellent low-temperature toughness and ductility by utilizing bainite formed at a lower temperature and bainite formed at a higher temperature. Specifically, the technique attempts to obtain a steel sheet having excellent low-temperature toughness and ductility by cooling steel containing C: 0.10 to 0.5% to 150° C. to 400° C. at a cooling rate of 10° C./s or more after annealing, holding at the temperature range for 10 to 200 sec, thereby forming lower-temperature-region bainite, reheating to a temperature range of higher than 400° C. and 540° C. or lower, and holding for 50 sec or more, thereby forming higher-temperature-region bainite.

PATENT LITERATURE

PTL 1: Japanese Examined Patent Application Publication No. 6-35619
PTL 2: Japanese Patent No. 4411221
PTL 3: Japanese Patent No. 5463685
PTL 4: Japanese Patent No. 3881559
PTL 5: Japanese Patent No. 3854506

SUMMARY OF THE INVENTION

Conventional TRIP steel disclosed in Patent Literature 1 has a problem in which stretch flangeability is extremely poor despite excellent El.

In the technique disclosed in Patent Literature 2, bainitic ferrite is primarily utilized and ferrite is suppressed to be in a small amount in the microstructure. As a result, stretch flangeability is excellent, but ductility is not necessarily high. For this reason, further improvement in ductility is needed in view of application to difficult-to-form parts.

In the technique disclosed in Patent Literature 3, relatively high ductility and excellent stretch flangeability are achieved compared with conventional TRIP steel and steel utilizing bainitic ferrite. However, fracture is observed during forming of difficult-to-form parts, such as a center pillar, and thus further enhanced ductility is required. Meanwhile, in a steel sheet to which this technique is applied, uniform deformation, which indicates resistance to fracture, is revealed to be not necessarily satisfactory. Such uniform deformation in El, which is an indicator of ductility, is denoted by U.El, which represents elongation until necking starts to occur, and this U.El is required to be increased further.

In the technique disclosed in Patent Literature 4, to decrease blocky martensite, the amount of polygonal ferrite formed is decreased and consequently satisfactory ductility cannot be ensured. Moreover, a cooling stop temperature is set to relatively high to enhance El. Accordingly, a large amount of untransformed γ remains when cooling is stopped. As a result, blocky martensite tends to remain.

In the technique disclosed in Patent Literature 5, lower temperature region-transformed bainite and higher temperature region-transformed bainite are utilized to enhance ductility. However, bainite transformed at a lower temperature contributes less to enhanced ductility. Meanwhile, when bainite formed at a higher temperature is utilized, a blocky microstructure tends to remain. Accordingly, it is difficult to impart high ductility and high stretch flangeability simultaneously.

As in the foregoing, a steel sheet that ensures satisfactorily high ductility and high stretch flangeability has not been obtained by conventional techniques.

Aspects of the present invention have been made to resolve such problems, and an object is to provide, even when the tensile strength is 780 to 1,450 MPa grade, a steel sheet having extremely high ductility and excellent stretch flangeability and a manufacturing method therefor.

The present inventors intensively studied how to impart extremely high ductility and excellent stretch flangeability to a steel sheet and reached the following conclusions.

First, causes (1) of unsatisfactory stretch flangeability in austempered TRIP steel and causes (2) of unsatisfactory ductility in steel that employs Q&P in conventional technique were investigated. The causes (1) are presumably as follows. In austempered TRIP steel, carbon diffuses into untransformed austenite from bainite during austempering at around 400° C., and bainite transformation stagnates when the carbon amount in austenite approaches the $T_0$ composition, where free energy of the bcc phase and free energy of the fcc phase become equal. Due to this stagnation in transformation, a blocky microstructure composed of retained γ and/or hard martensite in which carbon is concentrated near the $T_0$ composition remains. Meanwhile, the causes (2) are presumably as follows. In steel that employs Q&P, a blocky microstructure can be decreased by sufficiently lowering a cooling stop temperature. However, retained γ is not stabilized satisfactorily since supply of carbon to the austenite phase is obstructed due to stabilization of carbon and/or precipitation of carbides in martensite.

When attempting to form a large amount of upper bainite in the final tempering stage of the Q&P process, the phenomenon of (1) inevitably occurs. In other words, in the conventionally proposed heat treatment methods, it is difficult to achieve both a decreased blocky microstructure and utilization of stable retained γ formed adjacent to upper bainite. Accordingly, it is difficult to transcend certain ranges of ductility and stretch flangeability achieved by conventional techniques.

Against such difficulties, a heat treatment technique that can achieve both a decreased blocky microstructure and utilization of stable retained γ formed adjacent to upper bainite and that can impart properties that transcend the property ranges to a steel sheet by the above-described techniques was newly found. The technique is summarized as follows.

(i) In a cooling process after annealing, higher-temperature-region bainite is preferentially formed by holding for 14 sec or more and 200 sec or less at around 450° C. (405° C. to 470° C.) of the nose of upper bainite transformation that involves little precipitation of carbides. Through this intermediate holding, plate-like (acicular in the cross-sectional microstructure) retained γ, which contributes to enhanced ductility, is formed in the final microstructure.

(ii) In the remaining untransformed γ region, secondary cooling is started before a carbon concentration reaches the $T_0$ composition, which results in formation of a blocky microstructure, to cool to a lower temperature region of Ms−90° C. (at least 335° C. or lower in the present component composition range). By this cooling, the untransformed γ region is divided through martensite transformation or lower bainite transformation, thereby satisfactorily decreasing a blocky microstructure.

(iii) Subsequently, by reheating to and holding at around 400° C., martensite is converted into tempered martensite, and at the same time, carbon is partitioned in plate-like retained $\gamma_{UB}$ formed adjacent to upper bainite through the intermediate holding during cooling and in film-like retained γ remaining adjacent to martensite and/or lower bainite formed during the secondary cooling, thereby stabilizing two types of plate-like and film-like retained γ. In this two-stage cooling+reheating/holding process, carbon enrichment is noticeably promoted especially in plate-like $\gamma_{UB}$. This is because consumption of carbon due to carbide precipitation is suppressed near plate-like $\gamma_{UB}$ and migration of carbon from bainite to γ readily occurs in high-temperature-region upper bainite formed at 405° C. or higher near plate-like $\gamma_{UB}$.

(iv) In the case of combined forming that involves, for example, both stretch forming and stretch flanging for a single part, an increased bead tension of a press decreases an incoming steel sheet and consequently, cracking tends to occur in a stretched portion, whereas a decreased bead tension increases an incoming steel sheet and consequently, cracking tends to occur in a flange portion. To avoid cracking in these portions, it is important to control uniform elongation (U.El) as an indicator of ductility and ? as an indicator of stretch flangeability within a range represented by (TS×U.El−7,000)×λ≥290,000 for 780 to 1,180 MPa grade. Also by further limiting parts and optimizing part shapes, higher-strength 1,320 MPa grade is applicable. However, even when 1,320 MPa grade is used, also controlling within a range represented by (TS×U.El−7,000)×λ≥200,000 is important. Moreover, stability in forming is remarkably enhanced by ensuring U.El of 9% or more and more preferably 10% or more for TS of 780 to 1,180 MPa grade (780 to 1,319 MPa in the TS range) and 8% or more and more preferably 9% or more for TS of 1,320 MPa grade (1320 MPa or higher in the TS range) as well as λ of 40% or more and more preferably 45% or more for TS of 780 to 1,180 MPa grade (780 to 1,319 MPa in the TS range) and 30% or more and more preferably 35% or more for TS of 1,320 MPa grade (1,320 MPa or higher in the TS range).

As in the foregoing, by performing a two-stage cooling process that exploits upper bainite transformation before martensite transformation and that controls the residual amount of a blocky microstructure in the remainder through the Q&P process, it is possible to achieve both a decreased blocky microstructure and utilization of stable retained γ, which have been previously difficult to achieve. As a result, a steel sheet having both extremely high ductility and excellent stretch flangeability can be obtained. Further, according to aspects of the present invention, an increase in strength is also possible.

Aspects of the present invention have been made on the basis of the above findings and specifically provide the following.

[1] A steel sheet having a component composition containing, in mass %, C: 0.06 to 0.25%, Si: 0.6 to 2.5%, Mn: 2.3 to 3.5%, P: 0.02% or less, S: 0.01% or less, sol. Al: less than 0.50%, and N: less than 0.015%, with the balance being iron and incidental impurities, the steel sheet containing, in area ratio, 6 to 80% of ferrite and 20 to 94% of a microstructure composed of one or two or more of upper bainite, fresh martensite, tempered martensite, lower bainite, and retained γ, and containing, in volume ratio, 7 to 20% of retained γ, where: an area ratio ($S_{\gamma UB}$) of retained $\gamma_{UB}$ having a particle width of 0.18 to 0.60 µm, a particle length of 1.7 to 7.0 µm, and an aspect ratio of 5 to 15 is 0.2 to 5%; and a total area ratio ($S_{\gamma Block}$) of fresh martensite having an equivalent circle diameter of 1.5 to 15 µm and an aspect ratio of 3 or less and/or retained γ particles having an equivalent circle diameter of 1.5 to 15 µm and an aspect ratio of 3 or less is 3% or less (including 0%).

[2] The steel sheet according to [1], where a ratio ($N_{MA}/N_P$) of a total number ($N_{MA}$) of fresh martensite having an aspect ratio of 3 or less and an equivalent circle diameter of 0.15 to 1.9 µm and/or retained γ particles having an aspect ratio of 3 or less and an equivalent circle diameter of 0.15 to 1.9 µm, where the fresh martensite and the retained γ particles are distributed inside polygonal ferrite, to a total number ($N_P$) of polygonal ferrite grains is 0.3 or less.

[3] The steel sheet according to [1] or [2], where a total area ratio ($S_{C\text{-}enriched}$) of a region, whose adjacent region has a C concentration of 0.07% or less, having a C concentration of 0.7 to 1.3% is 0.2 to 5% in the microstructure.

[4] The steel sheet according to [3], where the region, whose adjacent region has a C concentration of 0.07% or less, having a C concentration of 0.7 to 1.3% is retained γ.

[5] The steel sheet according to [3], where the region, whose adjacent region has a C concentration of 0.07% or less, having a C concentration of 0.7 to 1.3% is retained $\gamma_{UB}$ particles.

[6] The steel sheet according to any one of [3] to [5], where the adjacent region contains upper bainite.

[7] The steel sheet according to any one of [1] to [6], where a ratio ($Mn_{\gamma 2nd}/Mn_{Bulk}$) of a Mn concentration ($Mn_{\gamma 2nd}$) in a region composed of upper bainite, fresh martensite, tempered martensite, lower bainite, and retained γ, which are the remainder excluding polygonal ferrite, to an average Mn concentration ($Mn_{Bulk}$) in the steel sheet is 1.1 or more.

[8] The steel sheet according to any one of [1] to [7], where the component composition further contains, in mass %, one or two or more selected from Ti: 0.002 to 0.1% and B: 0.0002 to 0.01%.

[9] The steel sheet according to any one of [1] to [8], where the component composition further contains, in mass %, one or two or more selected from Cu: 0.005 to 1%, Ni: 0.01 to 1%, Cr: 0.01 to 1.0%, Mo: 0.01 to 0.5%, V: 0.003 to 0.5%, Nb: 0.002 to 0.1%, Zr: 0.005 to 0.2%, and W: 0.005 to 0.2%.

[10] The steel sheet according to any one of [1] to [9], where the component composition further contains, in mass %, one or two or more selected from Ca: 0.0002 to 0.0040%, Ce: 0.0002 to 0.0040%, La: 0.0002 to 0.0040%, Mg: 0.0002 to 0.0030%, Sb: 0.002 to 0.1%, and Sn: 0.002 to 0.1%.

[11] The steel sheet according to any one of [1] to [10], where the component composition further contains, in mass %, W: 0.005 to 0.2%.

[12] The steel sheet according to any one of [1] to [11], where a tensile strength is 780 MPa or higher and 1,450 MPa or lower.

[13] A manufacturing method for a steel sheet including: hot rolling and cold rolling a steel slab having the component composition according to any one of [1] and [8] to [11]; annealing the resulting cold-rolled steel sheet on a continuous annealing line (CAL) at an annealing temperature of 780° C. to 880° C.; cooling at an average cooling rate of 5.0° C./s to 2,000° C./s in a temperature range of 780° C. to 470° C.; holding at a temperature range of 470° C. to 405° C. for 14 to 200 sec; further cooling at an average cooling rate of 5.0° C./s to 80° C./s in a temperature range from 405° C. to a cooling stop temperature (Tsq) represented by a formula (A); heating at an average heating rate of 3° C./s or more in a temperature range from the cooling stop temperature to 370° C.; holding at 300° C. to 550° C. for 30 to 3,000 sec; and cooling to room temperature, where the cooling stop temperature Tsq (° C.) is
$$Ms-90 \geq Tsq \geq Ms-180 \quad (A)$$

$$Ms = 539 - 474 \times [\% \text{ C}]/(100 - V_F) \times 100 - 30.4 \times [\% \text{ Mn}] \times 1.2 - 12.1 \times [\% \text{ Cr}] - 7.5 \times [\% \text{ Mo}] - 17.7 \times [\% \text{ Ni}] \quad (B)$$

where [% C], [% Mn], [% Cr], [% Mo], and [% Ni] represent the content (mass %) of C, Mn, Cr, Mo, and Ni, respectively, or 0 if not contained, and $V_F$ represents an area ratio (%) of ferrite.

According to aspects of the present invention, a steel sheet having both extremely high ductility and excellent stretch flangeability can be obtained. Moreover, according to aspects of the present invention, an increase in strength is also possible.

BRIEF DESCRIPTION OF THE DRAWINGS

FIG. 1 shows an exemplary SEM image.
FIG. 2 illustrates an aspect ratio, a particle width, and a particle length.
FIG. 4 is an exemplary graph showing a relationship between C concentration and analysis length.

DETAILED DESCRIPTION OF EMBODIMENTS OF THE INVENTION

Figure 3:
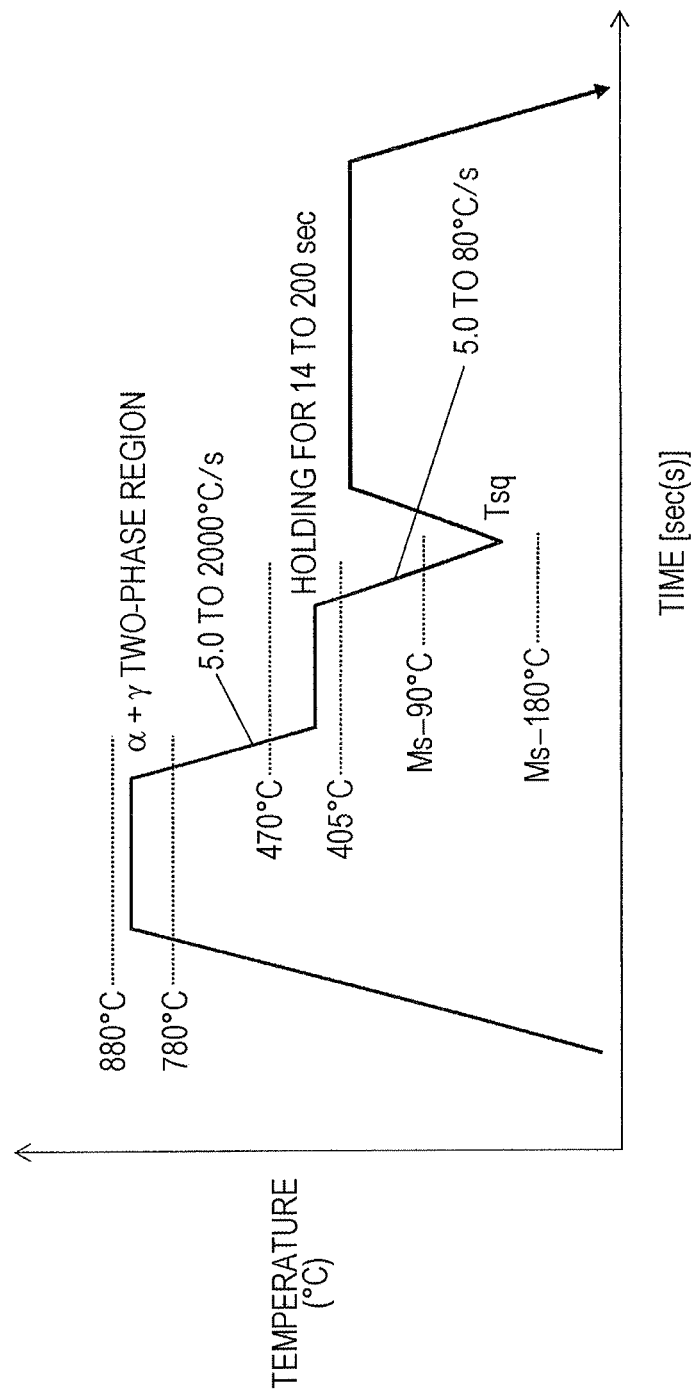
FIG. 3 illustrates exemplary manufacturing conditions.

Hereinafter, embodiments of the present inventions will be described specifically. The present invention, however, is not limited to the following embodiments.

A steel sheet according to aspects of the present invention has a particular component composition and a particular steel microstructure. Accordingly, a steel sheet according to aspects of the present invention will be described in the order of the component composition and then the steel microstructure.

A steel sheet according to aspects of the present invention contains the following components. In the description below, the symbol "%" that is the unit of a component content means mass %.

C: 0.06 to 0.25%

C is contained from a viewpoint of ensuring an area ratio of tempered martensite, thereby ensuring a predetermined strength, a viewpoint of ensuring a volume ratio of retained γ, thereby enhancing ductility, and a viewpoint of stabilizing retained γ through enrichment in retained γ, thereby enhancing ductility. When C content is less than 0.06%, it is impossible to satisfactorily ensure the ductility of a steel sheet and the strength of a steel sheet. Accordingly, the lower limit is set to 0.06%, preferably 0.09% or more, and more preferably 0.11% or more. Meanwhile, when the content exceeds 0.25%, upper bainite transformation in the intermediate holding during cooling is delayed, thereby making formation of a predetermined amount of plate-like retained $\gamma_{UB}$ adjacent to upper bainite transformation difficult. As a result, ductility deteriorates, and stretch flangeability also deteriorates due to increased blocky martensite or blocky retained γ. Moreover, various properties of a steel sheet, such as spot weldability, bendability, and hole expansion properties, deteriorate considerably. Accordingly, the upper limit of C content is set to 0.25%, preferably 0.22% or less from a viewpoint of enhancing spot weldability and ductility, and more preferably 0.20% or less from a viewpoint of further improving spot weldability and ductility.

Si: 0.6 to 2.5%

Si is contained from a viewpoint of strengthening ferrite, thereby increasing strength and a viewpoint of enhancing stability of retained γ through suppressed carbide formation in martensite and/or bainite, thereby enhancing ductility. To suppress carbide formation and enhance ductility, Si content is set to 0.6% or more. From a viewpoint of enhancing ductility, Si content is preferably 0.8% or more, more preferably 0.9% or more, and further preferably 1.0% or more. Meanwhile, when Si content exceeds 2.5%, a rolling load extremely increases, thereby making manufacture of sheets difficult. Moreover, chemical conversion properties and/or toughness in welds deteriorate. Accordingly, Si content is set to 2.5% or less. From a viewpoint of ensuring chemical conversion properties and/or toughness of welds and base material, Si content is preferably set to less than 2.0%. From a viewpoint of ensuring toughness in welds, Si content is set to preferably 1.8% or less and further preferably 1.5% or less.

Mn: 2.3 to 3.5%

Mn is an important element from a viewpoint of ensuring predetermined area ratios of tempered martensite and/or bainite, thereby ensuring strength, a viewpoint of stabilizing retained γ through enrichment in γ during annealing in the α+γ two-phase region and lowering in Ms temperature of retained γ, thereby improving ductility, a viewpoint of suppressing carbide formation in bainite in a similar manner to Si, thereby enhancing ductility, and a viewpoint of increasing a volume ratio of retained γ, thereby enhancing ductility. To obtain these effects, Mn content is set to 2.3% or more. In a technique that utilizes bainite transformation in the final step, among conventional heat treatment methods, when Mn is contained at 2.3% or more, a large amount of blocky microstructure composed of hard martensite and/or retained γ remains, thereby impairing stretch flangeability. However, in accordance with aspects of the present invention having a microstructure obtained by employing a heat treatment method described hereinafter, it is possible to decrease a blocky microstructure even when a large amount of Mn is contained and to benefit from volume ratio-increasing effect and/or stabilizing effect of retained γ due to incorporation of Mn. To stabilize retained γ and enhance ductility, Mn content is preferably 2.5% or more, preferably 2.6% or more, and more preferably 2.8% or more. Meanwhile, when Mn content exceeds 3.5%, it is difficult to ensure high ductility due to considerably delayed bainite transformation. In addition, when Mn content exceeds 3.5%, it becomes difficult to suppress formation of blocky coarse γ and/or blocky coarse martensite, and stretch flangeability also deteriorates. Accordingly, Mn content is set to 3.5% or less. From a viewpoint of promoting bainite transformation and ensuring high ductility, Mn content is set to preferably 3.2% or less and more preferably 3.1% or less.

P: 0.02% or Less

P is an element that strengthens steel, but the high content impairs spot weldability. Accordingly, P is set to 0.02% or less. From a viewpoint of improving spot weldability, P is preferably set to 0.01% or less. Although P need not be contained, P content is preferably 0.001% or more in view of manufacturing costs.

S: 0.01% or Less

S is an element that effectively improves descaling properties in hot rolling and effectively suppresses nitriding during annealing, but strongly and adversely affects spot weldability, bendability, and hole expansion properties. To reduce such adverse effects, at least S is set to 0.01% or less. In accordance with aspects of the present invention, spot weldability tends to deteriorate due to extremely high contents of C, Si, and Mn. From a viewpoint of improving spot weldability, S is set to preferably 0.0020% or less and more preferably less than 0.0010%. Although S need not be contained, S content is preferably 0.0001% or more in view of manufacturing costs.

Sol. Al: Less than 0.50%

Al is contained for deoxidation or for stabilization of retained γ as a substitute of Si. The lower limit of sol. Al is not particularly limited, but is preferably 0.01% or more for stable deoxidation. Meanwhile, when sol. Al is 0.50% or more, the strength of base material extremely decreases and chemical conversion properties are also adversely affected. Accordingly, sol. Al is set to less than 0.50%. To achieve high strength, sol. Al is set to more preferably less than 0.20% and further preferably 0.10% or less.

N: Less than 0.015%

N is an element that forms nitrides, such as BN, AlN, and TiN, in steel and an element that impairs hot ductility of steel and thus impairs surface quality thereof. In addition, N has a harmful effect on B-containing steel by eliminating the effects of B through formation of BN. When N content is 0.015% or more, surface quality deteriorates considerably. Accordingly, N content is set to less than 0.015%. Although N need not be contained, N content is preferably 0.0001% or more in view of manufacturing costs.

The component composition of a steel sheet according to aspects of the present invention may appropriately contain the following optional elements in addition to the above-described components.

Ti: 0.002 to 0.1%

Ti fixes N in steel as TiN and acts to produce an effect of enhancing hot ductility and/or to promote an effect of enhancing hardenability by B. In addition, Ti is effective for refinement of a microstructure through precipitation of TiC. To obtain such effects, Ti content is preferably set to 0.002% or more. From a viewpoint of satisfactorily fixing N, Ti content is more preferably 0.008% or more and further preferably 0.010% or more. Meanwhile, Ti content exceeding 0.1% results in an increased rolling load and low ductility due to excessive precipitation strengthening. Accordingly, Ti content is preferably set to 0.1% or less and more preferably 0.05% or less. To ensure high ductility, Ti is further preferably set to 0.03% or less.

B: 0.0002 to 0.01%

B is an element that enhances hardenability of steel and has an advantage of readily forming predetermined area ratios of tempered martensite and/or bainite. In addition, delayed fracture resistance is enhanced by dissolved B which remains as solid solute. To obtain these effects of B, B content is preferably set to 0.0002% or more, more preferably 0.0005% or more, and further preferably 0.0010% or more. Meanwhile, when B content exceeds 0.01%, not only do the effects level off, but also hot ductility deteriorates considerably, thereby causing surface defects. Accordingly, B content is preferably 0.01% or less and more preferably 0.0050% or less. A further preferable range is 0.0030% or less.

Cu: 0.005 to 1%

Cu enhances corrosion resistance in the use environment of automobiles. In addition, Cu corrosion products cover a steel sheet surface and effectively suppress penetration of hydrogen into the steel sheet. Cu is an element that is incorporated when scrap is used as a raw material. By allowing incorporation of Cu, recycled materials can be used as raw materials, thereby decreasing manufacturing costs. In view of the above, Cu is preferably contained at 0.005% or more. Moreover, from a viewpoint of enhancing delayed fracture resistance, Cu is contained preferably at 0.05% or more and further preferably at 0.10% or more. Meanwhile, excessive Cu content causes formation of surface defects. Accordingly, Cu content is set to preferably 1% or less, more preferably 0.4% or less, and further preferably 0.2% or less.

Ni: 0.01 to 1%

Ni is also an element that acts to enhance corrosion resistance, in a similar manner to Cu. In addition, Ni acts to suppress formation of surface defects, which tends to occur when Cu is contained. Accordingly, Ni is contained preferably at 0.01% or more, more preferably at 0.04% or more, and further preferably at 0.06% or more. Meanwhile, excessive Ni content rather causes formation of surface defects due to non-uniform scale formation within a heating furnace. Moreover, increased costs result. Accordingly, Ni content is set to 1% or less, more preferably 0.4% or less, and further preferably 0.2% or less.

Cr: 0.01 to 1.0%

Cr may be contained due to the effect of enhancing hardenability of steel and the effect of suppressing carbide formation in martensite and upper/lower bainite. To obtain such effects, Cr content is preferably 0.01% or more, more preferably 0.03% or more, and further preferably 0.06% or more. Meanwhile, when Cr is contained excessively, pitting corrosion resistance deteriorates. Accordingly, Cr content is set to 1.0% or less, more preferably 0.8% or less, and further preferably 0.4% or less.

Mo: 0.01 to 0.5%

Mo may be contained due to the effect of enhancing hardenability of steel and the effect of suppressing carbide formation in martensite and upper/lower bainite. To obtain such effects, Mo content is preferably 0.01% or more, more preferably 0.03% or more, and further preferably 0.06% or more. Meanwhile, Mo considerably impairs chemical conversion properties of a cold-rolled steel sheet. Accordingly, the content is preferably set to 0.5% or less. From a viewpoint of enhancing chemical conversion properties, Mo is further preferably set to 0.15% or less.

V: 0.003 to 0.5%

V may be contained due to the effect of enhancing hardenability of steel, the effect of suppressing carbide formation in martensite and upper/lower bainite, the effect of refinement of a microstructure, and the effect of improving delayed fracture resistance through carbide precipitation. To obtain these effects, V content is preferably 0.003% or more, more preferably 0.005% or more, and further preferably 0.010% or more. Meanwhile, when a large amount of V is contained, castability deteriorates considerably. Accordingly, V content is preferably 0.5% or less, more preferably 0.3% or less, and further preferably 0.1% or less.

Nb: 0.002 to 0.1%

Nb may be contained due to the effect of increasing strength through refinement of a steel microstructure, the effect of promoting bainite transformation through grain refinement, the effect of improving bendability, and the effect of enhancing delayed fracture resistance. To obtain these effects, Nb content is preferably 0.002% or more, more preferably 0.004% or more, and further preferably 0.010% or more. Meanwhile, when a large amount of Nb is contained, ductility deteriorates due to excessively intense precipitation strengthening. In addition, an increase in rolling load and deterioration in castability result. Accordingly, Nb content is preferably 0.1% or less, more preferably 0.05% or less, and further preferably 0.03% or less.

Zr: 0.005 to 0.2%

Zr may be contained due to the effect of enhancing hardenability of steel, the effect of suppressing carbide formation in bainite, the effect of refinement of a microstructure, and the effect of improving delayed fracture resistance through carbide precipitation. To obtain such effects, Zr content is preferably 0.005% or more, more preferably 0.008% or more, and further preferably 0.010% or more. Meanwhile, when a large amount of Zr is contained, coarse precipitates, such as ZrN and ZrS, that remain undissolved during slab heating before hot rolling increase, thereby impairing delayed fracture resistance. Accordingly, Zr content is preferably 0.2% or less, more preferably 0.15% or less, and further preferably 0.08% or less.

W: 0.005 to 0.2%

W may be contained due to the effect of enhancing hardenability of steel, the effect of suppressing carbide formation in bainite, the effect of refinement of a microstructure, and the effect of improving delayed fracture resistance through carbide precipitation. To obtain such effects, W content is preferably 0.005% or more, more preferably 0.008% or more, and further preferably 0.010% or more. Meanwhile, when a large amount of W is contained, coarse precipitates, such as WN and WS, which remain undissolved during slab heating before hot rolling increase, thereby impairing delayed fracture resistance. Accordingly, W content is preferably 0.2% or less, more preferably 0.15% or less, and further preferably 0.08% or less.

Ca: 0.0002 to 0.0040%

Ca fixes S as CaS and contributes to improved bendability and improved delayed fracture resistance. Accordingly, Ca content is preferably set to 0.0002% or more, more preferably 0.0005% or more, and further preferably 0.0010% or more. Meanwhile, when a large amount of Ca is added, surface quality and/or bendability deteriorate. Accordingly, Ca content is set to preferably 0.0040% or less, more preferably 0.0035% or less, and further preferably 0.0020% or less.

Ce: 0.0002 to 0.0040%

In a similar manner to Ca, Ce also fixes S and contributes to improved bendability and improved delayed fracture resistance. Accordingly, Ce content is set to preferably 0.0002% or more, more preferably 0.0004% or more, and further preferably 0.0006% or more. Meanwhile, when a large amount of Ce is added, surface quality and/or bendability deteriorate. Accordingly, Ce content is set to preferably 0.0040% or less, more preferably 0.0035% or less, and further preferably 0.0020% or less.

La: 0.0002 to 0.0040%

In a similar manner to Ca, La also fixes S and contributes to improved bendability and improved delayed fracture resistance. Accordingly, La content is set to preferably 0.0002% or more, more preferably 0.0004% or more, and further preferably 0.0006% or more. Meanwhile, when a large amount of La is added, surface quality and/or bendability deteriorate. Accordingly, La content is set to preferably 0.0040% or less, more preferably 0.0035% or less, and further preferably 0.0020% or less.

Mg: 0.0002 to 0.0030%

Mg fixes O as MgO and contributes to improved delayed fracture resistance. Accordingly, Mg content is set to preferably 0.0002% or more, more preferably 0.0004% or more, and further preferably 0.0006% or more. Meanwhile, when a large amount of Mg is added, surface quality and/or bendability deteriorate. Accordingly, Mg content is set to preferably 0.0030% or less, more preferably 0.0025% or less, and further preferably 0.0010% or less.

Sb: 0.002 to 0.1%

Sb suppresses oxidation and/or nitriding in a steel sheet surface layer portion, thereby suppressing a decrease in C and/or B content in the surface layer due to oxidation and/or nitriding. In addition, by suppressing such a decrease in C and/or B content, ferrite formation in a steel sheet surface layer portion is suppressed, thereby increasing strength and improving delayed fracture resistance. In view of the above, Sb content is preferably 0.002% or more, more preferably 0.004% or more, and further preferably 0.006% or more. Meanwhile, when Sb content exceeds 0.1%, castability deteriorates and delayed fracture resistance on a sheared edge deteriorates due to segregation at prior γ grain boundaries. Accordingly, Sb content is preferably 0.1% or less, more preferably 0.04% or less, and further preferably 0.03% or less.

Sn: 0.002 to 0.1%

Sn suppresses oxidation and/or nitriding in a steel sheet surface layer portion and suppresses a decrease in C and/or B content in a surface layer due to oxidation and/or nitriding. In addition, by suppressing such a decrease in C and/or B content, ferrite formation in a steel sheet surface layer portion is suppressed, thereby increasing strength and improving delayed fracture resistance. In view of the above, Sn content is preferably 0.002% or more, more preferably 0.004% or more, and further preferably 0.006% or more. Meanwhile, when Sn content exceeds 0.1%, castability deteriorates. Moreover, due to segregation of Sn at prior γ grain boundaries, delayed fracture resistance on a sheared edge deteriorates. Accordingly, Sn content is preferably 0.1% or less, more preferably 0.04% or less, and further preferably 0.03% or less.

The balance other than the above-described components is Fe and incidental impurities. Here, when the above-described optional components are contained at less than the respective lower limits, such optional elements contained at less than the respective lower limits do not damage the effects according to aspects of the present invention. Accordingly, when any of the above-described optional elements is contained at less than the lower limit, such an optional element is regarded as being contained as an incidental impurity.

Next, the steel microstructure of a steel sheet according to aspects of the present invention will be described.

Ferrite: 6 to 80%

To ensure high ductility, an area ratio of ferrite is set to 6% or more, more preferably 8% or more, and further preferably 11% or more. Meanwhile, to achieve a predetermined strength, the area ratio of ferrite is set to 80% or less, more preferably 50% or less, further preferably less than 20%, and still further preferably less than 15%. Here, ferrite means polygonal ferrite.

Microstructure Composed of One or Two or More of Upper Bainite, Fresh Martensite, Tempered Martensite, Lower Bainite, and Retained γ: 20 to 94%

An area ratio of these microstructures is set to 20 to 94% to ensure a predetermined strength, ductility, and stretch flangeability. The lower limit is set to more preferably 50% or more, further preferably more than 80%, and still further preferably more than 85%. The upper limit is more preferably 92% or less and further preferably 89% or less. From the area ratios of upper bainite, fresh martensite, tempered martensite, lower bainite, and retained γ on an SEM micrograph, the respective contents of the microstructures are considered to be typically the following ranges. Upper bainite is 3 to 20% in area ratio, tempered martensite is 5 to 80% in area ratio, and lower bainite is 0 to 50% in area ratio.

Retained γ: 7 to 20%

To ensure high ductility, a volume ratio of retained γ is 7% or more, more preferably 9% or more, and further preferably 10% or more, relative to the entire steel microstructure. This amount of retained γ includes both retained γ formed adjacent to upper bainite and retained γ formed adjacent to martensite and/or lower bainite. Meanwhile, an excessively increased amount of retained γ causes lowering in strength, deterioration in stretch flangeability, and deterioration in delayed fracture resistance. Accordingly, the volume ratio of retained γ is set to 20% or less and more preferably 15% or less. Here, a volume ratio may be regarded as an area ratio.

Area Ratio ($S_{\gamma UB}$) of Retained $\gamma_{UB}$ Having Particle Width of 0.18 to 0.60 μm, Particle Length of 1.7 to 7.0 μm, and Aspect Ratio of 5 to 15:0.2 to 5%

In the manufacturing method described hereinafter, it is possible to obtain plate-like retained $\gamma_{UB}$ formed adjacent to upper bainite (bainitic ferrite) that contains few carbides by holding at an intermediate temperature range of 470° C. to 405° C. in the cooling process. The particles of plate-like retained $\gamma_{UB}$ have a particle width of 0.18 to 0.60 μm, a particle length of 1.7 to 7.0 μm, and an aspect ratio of 5 to 15. By forming such retained $\gamma_{UB}$, ductility is enhanced even when the amount formed is minute. Such an effect is obtained by ensuring the area ratio of retained $\gamma_{UB}$ ($S_{\gamma UB}$) of 0.2% or more. Accordingly, $S_{\gamma UB}$ is set to 0.2% or more. By setting $S_{\gamma UB}$ to 0.3% or more, ductility is enhanced significantly. Accordingly, $S_{\gamma UB}$ is further preferably set to 0.3% or more and more preferably 0.4% or more. It should be noted here that fresh martensite results when the amount of C enrichment is small even in a steel microstructure having the same particle width, particle length, and aspect ratio as the above. Such a steel microstructure not only contributes considerably less to enhanced ductility, but also impairs stretch flangeability significantly. Such a microstructure is a type of the microstructure called MA. The microstructure specified here is stable γ significantly enriched with C, and is different from and thus should be distinguished from such MA. Accordingly, as described hereinafter, the present microstructure is limited only to a microstructure that is confirmed by EBSD to be the fcc structure. Meanwhile, when such plate-like retained $\gamma_{UB}$ is too much, the amount of carbon consumed increases excessively, thereby considerably lowering strength. In addition, deterioration in stretch flangeability and/or deterioration in delayed fracture resistance results. Accordingly, $S_{\gamma UB}$ is set to 5% or less, more preferably 4% or less, and further preferably 3% or less. Here, the above-mentioned area ratio means an area ratio relative to the entire steel microstructure. The area ratio of retained $\gamma_{UB}$ can be distinguished from other metal phases (bcc-type) by obtaining phase map data using EBSD and measuring only a microstructure of the fcc structure.

As in the foregoing, retained γ having a particle length of 1.7 μm or more is plate-like, and retained γ having a particle length of less than 1.7 μm is regarded as film-like.

Total Area Ratio ($S_{\gamma Block}$) of Fresh Martensite Having Equivalent Circle Diameter of 1.5 to 15 μm and Aspect Ratio of 3 or Less and/or Retained γ Particles Having Equivalent Circle Diameter of 1.5 to 15 μm and Aspect Ratio of 3 or Less: 3% or Less (Including 0%)

Conventionally, when attempting to cause bainite transformation preferentially in the final tempering step, blocky martensite or blocky retained γ predominantly remains. To prevent this, conventionally, bainite transformation is promoted by decreasing Mn to 2% or less and/or bainite transformation is promoted by rapid cooling from the γ single phase. However, ductility deteriorates since a volume ratio-increasing effect and/or a stabilizing effect of retained γ is lost due to a decreased Mn content or since ferrite is not formed when the entire microstructure surface undergoes bainite transformation by rapid cooling from the γ single phase. In contrast, in accordance with aspects of the present invention, it is possible to achieve both utilization of bainite transformation and a decreased blocky microstructure even when a steel sheet containing a large amount of Mn is annealed in the two-phase region. The blocky microstructure that adversely affect stretch flangeability is fresh martensite having an equivalent circle diameter of 1.5 to 15 μm and an aspect ratio of 3 or less and/or retained γ particles having an equivalent circle diameter of 1.5 to 15 μm and an aspect ratio 3 or less. By decreasing the total area ratio ($S_{\gamma Block}$) to 3% or less, excellent stretch flangeability can be ensured. To ensure excellent stretch flangeability, $S_{\gamma Block}$ is further preferably set to less than 2% and $S_{\gamma Block}$ may be 0%. Here, when either fresh martensite having an equivalent circle diameter of 1.5 to 15 μm and an aspect ratio of 3 or less or retained γ particles having an equivalent circle diameter of 1.5 to 15 μm and an aspect ratio 3 or less are contained, the area ratio of either one contained is regarded as the total area ratio.

Ratio ($N_{MA}/N_P$) of Total Number ($N_{MA}$) of Fresh Martensite Having Aspect Ratio of 3 or Less and Equivalent Circle Diameter of 0.15 to 1.9 μm and/or Retained γ Particles Having Aspect Ratio of 3 or Less and Equivalent Circle Diameter of 0.15 to 1.9 μm, where Fresh Martensite and Retained γ Particles are Distributed Inside Polygonal Ferrite, to Total Number ($N_P$) of Polygonal Ferrite Grains: 0.3 or Less To utilize bainite transformation, for example, when annealing in the γ single-phase region is performed, and the annealing is followed by mild cooling at 15° C./s or less, polygonal ferrite is formed during the cooling while inside ferrite grains, circular to elliptic fine fresh martensite and/or retained γ having an aspect ratio of 3 or less and an equivalent circle diameter of 0.15 to 1.9 μm that are distributed inside polygonal ferrite being inevitably formed. In this microstructure, the C amount (about 1%) that satisfactorily stabilizes retained γ is not reached, but a certain amount of C and Mn enrichment inevitably occurs during the mild cooling. Thus, the Ms temperature is lowered, and consequently, the microstructure cannot undergo martensite transformation before tempering due to a lowered Ms temperature and becomes fresh martensite or remains as retained γ with a small amount of C enrichment during the final cooling. Such a microstructure is transformed into extremely hard martensite or in the case of retained γ, extremely hard martensite after slight plastic deformation. Accordingly, even if the particle diameter is less than 2 μm, deterioration in λ results. Such an effect is decreased when the ratio ($N_{MA}/N_P$) of a total number ($N_{MA}$) of fresh martensite and/or retained γ particles to a total number ($N_P$) of polygonal ferrite grains is 0.3 or less. $N_{MA}/N_P$ is thus set to this range. Moreover, the ratio $N_{MA}/N_P$ may be 0. When neither fresh martensite nor retained γ particles are contained, the ratio $N_{MA}/N_P$ is 0. Here, when either of fresh martensite having an aspect ratio of 3 or less and an equivalent circle diameter of 0.15 to 1.9 μm or retained γ particles having an aspect ratio of 3 or less and an equivalent circle diameter of 0.15 to 1.9 μm are contained, the number of either one contained is regarded as the total number $N_{MA}$.

Total Area Ratio ($S_{C-enriched}$) of Region, Whose Adjacent Region has C Concentration of 0.07% or Less, Having C Concentration of 0.7 to 1.3%: 0.2 to 5%

By adjusting an area ratio of a region whose C concentration is higher than the surroundings, ductility can be enhanced. Specifically, by setting a total area ratio ($S_{C-enriched}$) of a region, whose adjacent region has a C concentration of 0.07% or less, having a C concentration of 0.7 to 1.3% to 0.2 to 5%, ductility can be enhanced. Here, the adjacent region means a region that adjoins a region, whose adjacent region has a C concentration of 0.07% or less, having a C concentration of 0.7 to 1.3%.

From a viewpoint of enhancing ductility, the region, whose adjacent region has a C concentration of 0.07% or less, having a C concentration of 0.7 to 1.3% is preferably retained γ and more preferably retained $\gamma_{UB}$. In addition, the adjacent region preferably contains upper bainite partially or entirely. Accordingly, a case in which the region, whose adjacent region has a C concentration of 0.07% or less, having a C concentration of 0.7 to 1.3% is retained $\gamma_{UB}$ and the adjacent region is upper bainite will be described hereinafter. Here, $S_{C-enriched}$ is denoted by $S_{\gamma UB*}$ when the above-mentioned region is retained $\gamma_{UB}$ and the adjacent region is upper bainite.

Retained $\gamma_{UB}$ formed adjacent to upper bainite is characterized in that a C amount is extremely low at least on either side of the particles. In other words, migration of C readily progresses into austenite from bainite (bainitic ferrite) formed at a higher temperature of 405° C. to 470° C., thereby efficiently enriching plate-like $\gamma_{UB}$ with C. As a result, a C amount of plate-like retained $\gamma_{UB}$ reaches 0.7 to 1.3% and contributes to enhanced ductility. Meanwhile, in the surrounding region of upper bainite, a C amount decreases to 0.07% or less. To further enhance ductility, it is preferable to ensure, in area ratio, 0.2 to 5% of retained γ region ($S_{\gamma UB*}$) having such a distribution state of C. By setting $S_{\gamma UB*}$ to 0.3% or more, ductility is enhanced significantly. Accordingly, $S_{\gamma UB*}$ is further preferably set to 0.3% or more. The upper limit is more preferably 4% or less and further preferably 3% or less.

Ratio ($Mn_{\gamma 2nd}/Mn_{Bulk}$) of Mn Concentration ($Mn_{\gamma 2nd}$) in Region Composed of Upper Bainite, Fresh Martensite, Tempered Martensite, Lower Bainite, and Retained γ, which are the Remainder Excluding Polygonal Ferrite, to Average Mn Concentration in Steel Sheet ($Mn_{Bulk}$): 1.1 or More Aspects of the present invention presuppose annealing in the α+γ two-phase region, and further enhancement in ductility is preferably sought by utilizing uniform Mn enrichment into the austenite region from the ferrite region that occurs during the annealing in the two-phase region. As described above, by partitioning Mn uniformly in the γ region through the annealing in the two-phase region, a stabilizing effect on retained γ due to Mn enrichment is obtained in a region where both plate-like retained $\gamma_{UB}$ and film-like retained γ exist, thereby contributing to further enhancement in ductility. Such an effect is obtained by setting a ratio ($Mn_{\gamma 2nd}/Mn_{Bulk}$) of a Mn concentration ($Mn_{\gamma 2nd}$) in a region composed of, excluding polygonal ferrite, upper bainite, fresh martensite, tempered martensite, lower bainite, and retained γ to an average Mn concentration in a steel sheet ($Mn_{Bulk}$) to 1.1 or more. The upper limit is preferably 2.0 or less and more preferably 1.5 or less.

Next, a measurement method of a steel microstructure will be described.

The measurement of a ferrite area ratio is performed by a method including cutting out a cross-section in the thickness direction parallel to the rolling direction, mirror-polishing, etching with 3% Nital, and observing five fields of view at a ¼ thickness position and a magnification of 5,000×. Ferrite is observed as relatively equiaxed polygonal ferrite containing few carbides inside. Such a region looks the blackest under an SEM. When plate-like retained $\gamma_{UB}$ exists inside ferrite to divide ferrite and it is difficult to distinguish whether a microstructure on each side is upper bainite or ferrite, an area ratio was calculated after classifying a region of ferrite in a polygonal form having an aspect ratio of ≤2.5 as ferrite and that having an aspect ratio of >2.5 as upper bainite (bainitic ferrite). Here, regarding the above, upper bainite formed adjacent to plate-like retained $\gamma_{UB}$ is formed adjacent to ferrite and is indistinguishable from ferrite in some cases. Accordingly, at plate-like retained $\gamma_{UB}$, a microstructure distinguishable as bainite exists in some cases and when ferrite and bainite exist adjacent, an indistinguishable region thereof, in other words, ferrite under the above classification exists in other cases. Here, as illustrated in FIG. 2, an aspect ratio (a/b) is determined by obtaining a major axis length (a) that is the longest particle length and setting a longest particle length that crosses a particle in the perpendicular direction to the major axis length (a) as a minor axis length (b).

The area ratio of a microstructure composed of one or two or more of upper bainite, fresh martensite, tempered martensite, lower bainite, and retained γ was measured by a technique similar to that for ferrite. This area ratio is an area ratio of a region other than the above-described ferrite. Here, an area ratio of carbides is extremely small and thus included in the above-mentioned area ratio.

A volume ratio of retained γ was obtained by chemical polishing at a ¼ thickness position from a surface layer, followed by X-ray diffraction. A Co—Kα source was used for an incident X-ray, and an area ratio of retained austenite was calculated from intensity ratios of (200), (211), and (220) planes of ferrite to (200), (220), and (311) planes of austenite. Here, since retained γ is distributed randomly, a volume ratio of retained γ obtained by X-ray diffraction is equal to an area ratio of retained γ in a steel microstructure.

The shape and area ratio of plate-like retained $\gamma_{UB}$ formed adjacent to upper bainite were obtained by electrolytically polishing a cross-section in the thickness direction parallel to the rolling direction of a steel sheet, obtaining phase map data by using EBSD, and identifying a microstructure having the fcc structure. In a measurement region of 30 µm, five fields of view were measured. By employing the above-described measurement methods for a particle size and for an aspect ratio, a particle length (major axis length), a particle width (minor axis length), and an aspect ratio were obtained. Moreover, an area ratio was obtained as $S_{\gamma UB}$ for γ particles that correspond to a particle width of 0.18 to 0.60 µm, a particle length of 1.7 to 7.0 µm, and an aspect ratio of 5 to 15.

The area ratio of fresh martensite having an equivalent circle diameter of 1.5 to 15 µm and an aspect ratio of 3 or less and/or retained γ particles having an equivalent circle diameter of 1.5 to 15 µm and an aspect ratio of 3 or less was similarly obtained from an SEM micrograph. In addition, aspect ratios were confirmed by a method similar to the above-described method for plate-like retained $\gamma_{UB}$.

The equivalent circle diameter was determined by observing ten particles under an SEM, obtaining each area ratio, and calculating an equivalent circle diameter for each particle.

The size and area ratio of fresh martensite or retained γ particles (handled without distinguishing fresh martensite and retained γ particles since these are indistinguishable on an SEM micrograph) distributed inside polygonal ferrite were measured with an SEM by a method similar to that for ferrite. Moreover, the number of polygonal ferrite grains was also confirmed from an SEM micrograph.

The measurement of a C concentration (mass %) in a region, whose adjacent region has a C concentration of 0.07% or less, having a C concentration of 0.7 to 1.3% as well as a C concentration (mass %) in the adjacent region is performed at a ¼ thickness position on a cross-section in the thickness direction parallel to the rolling direction by line analysis using a field emission electron probe microanalyzer (FE-EPMA) JXA-8500F from JEOL Ltd. while setting an accelerating voltage to 6 kV, an irradiation current to $7\times10^{-8}$ A, and a beam diameter to minimum. To obtain average information of a microstructure for an analysis length of 6 µm, C profile data was randomly acquired at 30 positions. Here, to eliminate the effect of contamination, the amount of the background is subtracted such that an average C value obtained by each line analysis is equal to the carbon amount of a base material. In other words, when a measured average carbon amount is larger than the carbon amount of a base material, the difference therebetween is considered as contamination, and a value obtained by equally subtracting the difference from an analysis value at each position is regarded as a true C amount at each position. The total area ratio ($S_{C\text{-}enriched}$) of a region, whose adjacent region has a C concentration of 0.07% or less, having a C concentration of 0.7 to 1.3% is determined as a ratio of a region having C: 0.7 to 1.3% to a region where a C amount in the base portion of a C peak is 0.07% or less in a line analysis result by assuming that a distribution state of the above-mentioned region is random. FIG. 4 is an exemplary graph showing a relationship between analysis length and C concentration obtained by the above-described measurement. In FIG. 4, a region, whose adjacent region having a C concentration of 0.07% or less, having a C concentration of 0.7 to 1.3% is $S_{C\text{-}enriched\text{-}1}$. The total area ratio ($S_{C\text{-}enriched}$) is obtained as a total of $S_{C\text{-}enriched\text{-}1}$ determined by plotting graphs as in FIG. 4 at 30 different positions.

Since the amount of C enrichment in the above-described plate-like retained $\gamma_{UB}$ can be measured by the above-described analysis technique, a metal phase having the amount of C enrichment of 0.7 to 1.3% may be evaluated as plate-like retained $\gamma_{UB}$ in evaluation of the characteristics.

The Mn concentration (mass %, $Mn_{\gamma 2nd}$) in a region composed of, excluding polygonal ferrite, upper bainite, fresh martensite, tempered martensite, lower bainite, and retained γ was obtained by performing line analysis of Mn by a similar method utilizing an FE-EPMA at an accelerating voltage of 9 kV, performing SEM microstructure observation for the same fields of view, and calculating the amount of Mn in the region of secondary phases excluding ferrite. Moreover, $Mn_{\gamma 2nd}Mn_{Bulk}$ was obtained by comparing with chemical analysis values of Mn in the base material.

FIG. 1 shows an exemplary SEM micrograph.

The steel sheet used for observation in FIG. 1 was obtained by annealing steel containing 0.18% of C, 1.5% of Si, and 2.8% of Mn in the two-phase region, cooling to 450° C. at 18° C./s, isothermally holding at 450° C. for 30 sec, cooling to 220° C. at 10° C./s, holding at 400° C. for 18 min, and cooling to 100° C. or lower at 10° C./s. The obtained steel sheet was polished at a ¼ thickness position on a cross-section perpendicular to the rolling direction, etched with 3% Nital, and observed under an SEM.

Upper bainite, fresh martensite, tempered martensite, lower bainite, and retained γ are evaluated separately on an SEM micrograph. Upper bainite (a) is a microstructure containing few carbides and having a width of 0.4 μm or more in the minor axis direction. Adjacent to upper bainite, plate-like retained γ (b) having a particle width of 0.18 to 0.60 μm, a particle length of 1.7 to 7.0 μm, and an aspect ratio of 5 to 15 exists. The adjacent microstructure to plate-like retained $\gamma_{UB}$ is upper bainite. When upper bainite is formed adjacent to ferrite, upper bainite and ferrite form an integrated microstructure. Consequently, plate-like retained $\gamma_{UB}$ looks adjacent to ferrite in some cases. Tempered martensite (c) is a region containing, inside the microstructure thereof, fine carbides (e) having an aspect ratio of 3 or less and an equivalent circle diameter of 0.03 to 0.2 μm at the number of 0.5 to 8 per 1 μm². Adjacent to tempered martensite, film-like retained γ (d) having a particle width of 0.1 to less than 0.50 μm and a particle length of 0.5 μm or more and less than 1.7 μm exists. Lower bainite (f) is a microstructure containing, inside the microstructure thereof, elongated film-like martensite or retained γ (g) having an aspect ratio of 8 to 20. In a region where bainite transformation or martensite transformation has not progressed satisfactorily, fresh martensite or retained γ particles (h) having an equivalent circle diameter of 1.5 to 15 μm and an aspect ratio of 3 or less remain. An untransformed region is polygonal ferrite (i). Although not shown on the micrograph, when annealing is performed in the γ single-phase region and polygonal ferrite is formed during cooling, the particles having an aspect ratio of 3 or less and an equivalent circle diameter of 0.15 to 1.9 μm are also formed inside polygonal ferrite grains.

A steel sheet according to aspects of the present invention has a tensile strength of preferably 780 MPa or higher and more preferably 980 MPa or higher. The upper limit of the tensile strength is preferably 1,450 MPa or lower and more preferably 1,400 MPa or lower in view of a balance with other properties.

In a steel, sheet according to aspects of the present invention, stability in forming is enhanced remarkably by ensuring a hole expansion ratio (λ) of 40% or more and preferably 45% or more for TS of 780 to 1,319 MPa grade and 30% or more and preferably 35% or more for TS of 1,320 MPa or higher. The upper limit of 2 for both strength levels is preferably 90% or less and more preferably 80% or less in view of a balance with other properties.

In a steel sheet according to aspects of the present invention, U.El is 9% or more and more preferably 10% or more for TS of 780 to 1,319 MPa grade and 8% or more and more preferably 9% or more for TS of 1,320 MPa or higher. Moreover, the upper limit of U.El for both strength levels is preferably 20.0% or less and more preferably 18.0% or less in view of a balance with other properties.

Further, from a viewpoint of improving formability in combined forming, (TS×U.El−7,000)×λ≥290,000 is preferable, (TS×U.El−7,000)×λ≥291,500 is more preferable, and (TS×U.El−7,000)×λ≥300,000 is further preferable. Although the upper limit is not particularly limited, (TS×U.El−7,000)×λ≤600,000 is preferable and (TS×U.El−7,000)×λ≤500,000 is more preferable in view of a balance with other properties.

Next, a manufacturing method of a steel sheet in accordance with aspects of the present invention will be described.

Hot Rolling

For hot rolling of steel slabs, there are a method of rolling a slab after heating, a method of directly rolling a slab after continuous casting without heating, a method of heating a slab after continuous casting for a short time and rolling, and the like. Hot rolling may be performed by a common method, for example, at a slab heating temperature of 1,100° C. to 1,300° C., a soaking time of 20 to 300 min, a finishing temperature of Ar₃ transformation temperature to (Ar₃ temperature+200° C.), and a coiling temperature of 400° C. to 720° C. The coiling temperature is set to preferably 450° C. to 550° C. from a viewpoint of decreasing thickness variations and ensuring high strength of a steel sheet in a stable manner. From a viewpoint of decreasing thickness variations and ensuring high strength in a stable manner, a more preferable range is 460° C. to 550° C. and a further preferable range is 500° C. to 550° C.

Cold Rolling

In cold rolling, the reduction ratio may be 30 to 85%. The reduction ratio is preferably 45 to 85% from a viewpoint of ensuring high strength in a stable manner and reducing anisotropy. When a rolling load is high, annealing treatment for softening may be performed on a CAL or in a BAF at 450° C. to 730° C.

CAL

A steel slab having a predetermined component composition undergoes annealing under the conditions specified below on a continuous annealing line (CAL) after hot rolling and cold rolling. FIG. 3 illustrates exemplary manufacturing conditions.

Annealing Temperature: 780° C. to 880° C.

The annealing temperature is set to 780° C. to 880° C. to ensure predetermined area ratios of tempered martensite and/or bainite as well as a predetermined volume ratio of retained γ. To ensure 6% or more of polygonal ferrite, the annealing temperature is adjusted for annealing in the α+γ two-phase region in accordance with the components. Through annealing in the two-phase region, Mn can be uniformly concentrated in γ, thereby contributing to stabilization of γ. Since Mn enrichment in γ is not needed during cooling, it is possible to suppress formation of fresh martensite or retained γ particles having an aspect ratio of 3 or less and an equivalent circle diameter of 0.15 to 1.9 μm that are otherwise distributed inside polygonal ferrite, thereby contributing to enhanced λ.

Average Cooling Rate in Temperature Range of 780° C. to 470° C.: 5.0° C./s to 2,000° C./s After annealing, cooling is performed at an average cooling rate of 5.0° C./s to 2,000° C./s in a temperature range of 780° C. to 470° C. When the average cooling rate is slower than 5.0° C./s, coarse bainitic ferrite is formed, thereby increasing a blocky microstructure. Accordingly, the average cooling rate is set to 5.0° C./s or more, more preferably 8.0° C./s or more. Meanwhile, when the average cooling rate is excessively fast, a sheet shape deteriorates. Accordingly, the average cooling rate is set to 2,000° C./s or less, preferably 100° C./s or less, and more preferably less than 30° C./s. Moreover, by preferably setting to 29° C./s or less, it is possible to achieve a good level of the sheet shape (warping, described hereinafter in the Examples section, of 15 mm or less). Further, by more preferably setting to 14° C./s or less, it is possible to achieve a better level of the sheet shape (warping, described hereinafter in the Examples section, of 10 mm or less).

Holding Time in Temperature Range of 470° C. to 405° C.: 14 to 200 Sec

By holding in this temperature range for a predetermined time, it is possible to form upper bainite while involving little precipitation of carbides therein and to form, adjacent to upper bainite, plate-like retained $\gamma_{UB}$ having a large amount of C enrichment. To form a predetermined amount of plate-like retained $\gamma_{UB}$ that contributes to enhanced ductility, the holding time in this temperature range is set to 14 sec or more. From a viewpoint of forming plate-like retained $\gamma_{UB}$ and enhancing ductility, the holding time in this temperature range is further preferably set to 18 sec or more. Meanwhile, even by holding for a holding time exceeding 200 sec, formation of plate-like $\gamma_{UB}$ stagnates. Then, holding for more than 200 sec results in progressing carbon enrichment in blocky untransformed γ and increasing residual amount of a blocky microstructure. Accordingly, the holding time in the temperature range of 470° C. to 405° C. is set to 14 to 200 sec. From a viewpoint of enhancing stretch flangeability, the holding time in the temperature range of 470° C. to 405° C. is preferably set to 100 sec or less. Here, holding in this temperature range corresponds to a decreased average cooling rate of 4.6° C./s or less in this temperature range.

Average Cooling Rate from 405° C. to Cooling Stop Temperature (Tsq): 5.0° C./s to 80° C./s Further, cooling is performed at an average cooling rate of 5.0° C./s to 80° C./s in a temperature range from 405° C. to a cooling stop temperature (Tsq) represented by the formula (A). When an average cooling rate is slow in this temperature range, C is concentrated in untransformed γ, thereby increasing a blocky microstructure. In addition, carbide precipitation progresses while consuming C, thereby causing deterioration in ductility. From a viewpoint of enhancing stretch flangeability due to a decreased blocky microstructure and enhancing ductility due to suppressed carbide precipitation, an average cooling rate in this temperature range is further preferably set to 7.0° C./s or more. Meanwhile, when the cooling rate exceeds 80° C./s, C diffusion from martensite or lower bainite into film-like γ is suppressed during cooling, the formation of film-like γ is suppressed, and ductility deteriorates. Accordingly, the average cooling rate in this temperature range is set to 5.0° C./s to 80° C./s. From a viewpoint of promoting C diffusion from martensite or lower bainite into film-like γ during cooling, the average cooling rate in this temperature range is preferably set to 15° C./s or less.

$$Cooling\ Stop\ Temperature\ Tsq\ (°\ C.)\ of\ Ms-90 \geq Tsq \geq Ms-180 \quad (A)$$

$$Ms = 539 - 474 \times [\%\ C]/(100-V_F) \times 100 - 30.4 \times [\%\ Mn] \times 1.2 - 12.1 \times [\%\ Cr] - 7.5 \times [\%\ Mo] - 17.7 \times [\%\ Ni] \quad (B)$$

where [% C], [% Mn], [% Cr], [% Mo], and [% Ni] represent the content (mass %) of C, Mn, Cr, Mo, and Ni, respectively, or 0 if not contained, and $V_F$ represents an area ratio (%) of ferrite.

The cooling stop temperature is set to the above range from a viewpoint of decreasing a blocky microstructure and obtaining plate-like retained $\gamma_{UB}$.

Here, when the average cooling rate in the range from 780° C. to 470° C. is denoted by CR1, the average cooling rate in the range from 470° C. to 405° C. is denoted by CR2, and the average cooling rate in the range from 405° C. to a cooling stop temperature is denoted by CR3, relationships of CR1>CR2 and CR2<CR3 are satisfied. It is extremely important to switch cooling rates like this.

Average Heating Rate in Temperature Range from Cooling Stop Temperature to 370° C.: 3° C./s or More By further heating in a temperature range from the cooling stop temperature to 370° C. for a short time, it is possible to suppress carbide precipitation and ensure high ductility. In addition, upper bainite is formed upon reheating at 370° C. or higher, where martensite or lower bainite formed by cooling serves as nuclei. When the average heating rate to 370° C. is slow, these effects cannot be obtained. As a result, the amount of retained γ decreases and ductility deteriorates. Accordingly, the average heating rate in the temperature range from the cooling stop temperature to 370° C. is set to 3° C./s or more. From a viewpoint of suppressing carbide precipitation and forming upper bainite during reheating, the average heating rate is preferably set to 5° C./s or more and further preferably 10° C./s or more. The upper limit of the average heating rate is not particularly limited, but is preferably 50° C./s or less and more preferably 30° C./s or less.

Holding Time at 300° C. to 550° C.: 30 to 3,000 Sec

Holding is performed in the temperature range of 300° C. to 550° C. for 30 to 3,000 sec from a viewpoint of partitioning C in plate-like retained $\gamma_{UB}$ formed by intermediate holding and/or in film-like retained γ formed adjacent to martensite or lower bainite, thereby stabilizing plate-like retained $\gamma_{UB}$ and film-like retained γ as well as from a viewpoint of enhancing λ through refinement of a blocky region distributed as untransformed γ through bainite transformation.

Further, by setting a holding time at 370° C. to 550° C. to 60 to 3,000 sec, a total area ratio ($S_{C-enriched}$) of a region, whose adjacent region has a C concentration of 0.07% or less, having a C concentration of 0.7 to 1.3% becomes 0.2 to 5%, thereby further improving ductility.

From a viewpoint of utilizing a refinement effect on untransformed γ through bainite transformation and enhancing λ, it is preferable to hold at 370° C. to 400° C. for 180 sec or more.

Subsequently, cooling is performed to room temperature. And a steel sheet may undergo skin-pass rolling from a viewpoint of stabilizing press formability through adjustment of surface roughness, leveling of a sheet shape, or the like, as well as a viewpoint of increasing YS. A skin-pass elongation is preferably set to 0.1 to 0.5%. In addition, leveling of a sheet shape is also possible with a leveler.

From a viewpoint of improving stretch flangeability, low-temperature heat treatment at 100° C. to 300° C. for 30 sec to 10 days may also be performed after the above-described heat treatment or skin-pass rolling. This treatment causes tempering of martensite formed in the final cooling or skin-pass rolling and also elimination, from a steel sheet, of hydrogen that has penetrated into the steel sheet during annealing. Through the low-temperature heat treatment, it is possible to decrease hydrogen to less than 0.1 ppm. In addition, electroplating may also be performed. After electroplating, the above-mentioned low-temperature heat treatment is preferably performed from a viewpoint of decreasing hydrogen in steel.

According to the Examples, it is possible for (TS×U.El−7,000)×λ, which is important as an indicator of formability of complex-shaped parts involving stretch forming and stretch flanging, to satisfy (TS×U.El−7,000)×λ≥290,000 for TS of 780 to 1,319 MPa grade and to satisfy (TS×U.El−7,000)×λ≥200,000 for TS of 1,320 MPa or higher grade. Moreover, it is also possible to impart excellent uniform elongation (ductility) of 9% or more for TS of 780 to 1,319 MPa grade and 8% or more for TS of 1,320 MPa or higher, as well as hole expansion properties (λ) of 40% or more for TS of 780 to 1,319 MPa grade and 30% or more for TS of 1,320 MPa or higher.

EXAMPLES

Cold-rolled steel sheets each having a component composition shown in Table 1 were treated under annealing conditions shown in Table 2-1 to make steel sheets of the Examples and steel sheets of Comparative Examples. The thickness of the steel sheets was set to 1.4 mm.

The measurement of a steel microstructure was performed by the above-described method. The measured results are shown in Table 2-2.

JIS No. 5 tensile test specimens were taken from the obtained steel sheets and underwent a tensile test (JIS Z 2241). The resulting TS and U.El are shown in Table 2.

Stretch flangeability was evaluated by a hole expansion test in accordance with JFS T 1001 by the Japan Iron and Steel Federation. Specifically, a sample of 100 mm×100 mm square size was punched with a punching tool having a punch diameter of 10 mm and a die diameter of 10.2 mm (clearance of 13%), and a hole was expanded by using a conical punch having a vertex angle of 60° while disposing a burr formed during punching outside until a crack penetrating the sheet thickness was formed. A hole expansion ratio (λ) was obtained from λ(%)=[(d−d$_0$)/d$_0$]×100 where d$_0$ is an initial hole diameter (mm) and d is a hole diameter (mm) when a crack is formed.

The Examples satisfy excellent uniform elongation (ductility) of 9% or more, (TS×U.El−7,000)×λ≥290,000, and hole expansion properties (λ) of 40% or more for 780 to 1,319 MPa grade, as well as excellent uniform elongation (ductility) of 8% or more, (TS×U.El−7,000)×λ≥200,000, and excellent hole expansion properties (λ) of 30% or more for TS of 1,320 MPa or higher. In contrast, the Comparative Examples are inferior in any of these properties.

Example Nos. 1, 9, 11, 13, 19, 26, 27, 28, 29, 30, and 31, in which a region, whose adjacent region has a C concentration of 0.07% or less, having a C concentration of 0.7 to 1.3% is composed of retained $\gamma_{UB}$ and the adjacent region contains upper bainite, are particularly excellent in ductility.

Moreover, the Examples in which an average cooling rate in a temperature range of 780° C. to 470° C. is 15° C./s or more and 29° C./s or less exhibit good level of warping measured by the method described below of 11 to 15 mm. Further, the Examples in which the above-mentioned average cooling rate is 5° C./s or more and 14° C./s or less exhibit a better level of warping measured by the method described below of 10 mm or less. The above-mentioned warping for evaluation of a sheet shape was evaluated by a method including taking a 1,500 mm-length cut sample from a steel sheet after annealing, disposing the sample on a horizontal flat plate, and measuring a maximum warping height (unit of mm) of the four sides.

TABLE 1

| Steel number | Component composition (mass %) | | | | | | | | Note |
|---|---|---|---|---|---|---|---|---|---|
| | C | Si | Mn | P | S | sol. Al | N | others | |
| A | 0.188 | 1.50 | 2.60 | 0.004 | 0.0004 | 0.070 | 0.0032 | Nb: 0.01, Ti: 0.02, B: 0.0011 | Example steel |
| B | 0.210 | 1.52 | 2.08 | 0.007 | 0.0012 | 0.040 | 0.0036 | Nb: 0.02, Ti: 0.018, B: 0.0012 | Comparative steel |
| C | 0.218 | 1.80 | 2.50 | 0.004 | 0.0003 | 0.055 | 0.0029 | Ti: 0.013, B: 0.0006, Cu: 0.2, Ni: 0.2 | Example steel |
| D | 0.228 | 1.38 | 2.72 | 0.005 | 0.0009 | 0.035 | 0.0025 | Nb: 0.012, Ti: 0.005, B: 0.0018, Ca: 0.0005 | Example steel |
| E | 0.135 | 1.38 | 2.35 | 0.004 | 0.0006 | 0.054 | 0.0034 | Nb: 0.025, Ti: 0.007, B: 0.0015, Sb: 0.01 | Example steel |
| G | 0.084 | 1.20 | 2.48 | 0.005 | 0.0004 | 0.090 | 0.002 | Zr: 0.008, W: 0.008, Mg: 0.001, Sn: 0.01 | Example steel |
| H | 0.280 | 1.52 | 2.72 | 0.005 | 0.0006 | 0.090 | 0.0035 | Nb: 0.01, Ti: 0.02, B: 0.0012 | Comparative steel |
| I | 0.040 | 1.51 | 2.60 | 0.007 | 0.0004 | 0.090 | 0.0031 | Nb: 0.01, Ti: 0.012, B: 0.0014 | Comparative steel |
| J | 0.170 | 0.40 | 2.50 | 0.006 | 0.0008 | 0.045 | 0.0034 | Ti: 0.013, B: 0.0006 | Comparative steel |
| K | 0.135 | 1.40 | 3.60 | 0.006 | 0.0005 | 0.045 | 0.0033 | — | Comparative steel |
| L | 0.180 | 1.40 | 2.10 | 0.005 | 0.0005 | 0.055 | 0.0032 | — | Comparative steel |
| M | 0.070 | 1.50 | 2.95 | 0.006 | 0.0004 | 0.045 | 0.0045 | Nb: 0.01, Ti: 0.013, B: 0.0010, Ce: 0.0009 | Example steel |
| N | 0.094 | 1.50 | 2.80 | 0.006 | 0.0004 | 0.057 | 0.0033 | Ti: 0.014, B: 0.0009, La: 0.001 | Example steel |
| O | 0.232 | 0.69 | 2.35 | 0.005 | 0.0005 | 0.490 | 0.0041 | Ti: 0.015, B: 0.0009, V: 0.12 | Example steel |
| P | 0.230 | 0.86 | 2.30 | 0.005 | 0.0005 | 0.410 | 0.0031 | Nb: 0.03, Ti: 0.007, B: 0.0009, V: 0.04, Mo: 0.06 | Example steel |
| Q | 0.241 | 0.74 | 2.50 | 0.004 | 0.0003 | 0.420 | 0.0028 | Nb: 0.021, Ti: 0.006, B: 0.0011, Cr: 0.12 | Example steel |
| R | 0.230 | 0.94 | 2.70 | 0.003 | 0.0003 | 0.400 | 0.0025 | — | Example steel |
| S | 0.130 | 1.50 | 3.25 | 0.007 | 0.0004 | 0.180 | 0.0025 | Nb: 0.015, Ti: 0.006, B: 0.0010 | Example steel |

* Underlines indicate the outside of the scope of the present invention.

TABLE 2-1

| | | Annealing conditions | | | | | | | | |
|---|---|---|---|---|---|---|---|---|---|---|
| No. | Steel number | Annealing temperature (° C.) | Soaking time (s) | CR1 (° C./s)*1 | Holding time*2 (sec) | CR3*3 (° C./s) | Cooling stop temperature (° C.) | Heating rate*4 (° C./s) | Holding temperature (° C.) | Holding time*5 (sec) | Note |
| 1 | A | 820 | 180 | 10 | 32.0 | 10 | 200 | 5 | 400 | 800 | Example |
| 2 | A | 885 | 180 | 10 | 32.0 | 10 | 260 | 5 | 400 | 800 | Comparative Example |
| 3 | A | 820 | 180 | 2 | 32.0 | 10 | 210 | 5 | 400 | 800 | Comparative Example |
| 4 | A | 820 | 180 | 10 | 14.0 | 10 | 200 | 5 | 400 | 800 | Example |
| 5 | A | 820 | 180 | 10 | 6.5 | 10 | 200 | 5 | 400 | 800 | Comparative Example |
| 6 | A | 820 | 180 | 10 | 6.5 | 10 | 200 | 5 | 400 | 800 | Comparative Example |
| 7 | A | 820 | 180 | 10 | 14.0 | 2 | 200 | 5 | 400 | 800 | Comparative Example |
| 8 | A | 820 | 180 | 2 | 32.0 | 2 | 200 | 5 | 400 | 800 | Comparative Example |

TABLE 2-1-continued

| | | Annealing conditions | | | | | | | | |
|---|---|---|---|---|---|---|---|---|---|---|
| No. | Steel number | Annealing temperature (° C.) | Soaking time (s) | CR1 (° C./s)*1 | Holding time*2 (sec) | CR3*3 (° C./s) | Cooling stop temperature (° C.) | Heating rate*4 (° C./s) | Holding temperature (° C.) | Holding time*5 (sec) | Note |
| 9 | A | 820 | 180 | 25 | 50.0 | 20 | 220 | 10 | 400 | 800 | Example |
| 10 | A | 820 | 180 | 25 | 32.0 | 20 | <u>260</u> | 10 | 400 | 800 | Comparative Example |
| 11 | A | 820 | 180 | 50 | 35.0 | 5 | 180 | 10 | 370 | 1200 | Example |
| 12 | A | 820 | 180 | 25 | <u>300.0</u> | 20 | 220 | 10 | 400 | 800 | Comparative Example |
| 13 | A | 820 | 180 | 25 | 32.0 | 7 | 200 | 10 | 500 | 800 | Example |
| 14 | A | 820 | 180 | 25 | 32.0 | 7 | 200 | 10 | 400 | <u>30</u> | Comparative Example |
| 15 | <u>B</u> | 820 | 180 | 20 | 32.0 | 7 | 200 | 5 | 400 | 800 | Comparative Example |
| 16 | <u>B</u> | 880 | 180 | 20 | <u>2.5</u> | 26 | 200 | 5 | 450 | 300 | Comparative Example |
| 17 | <u>B</u> | 820 | 180 | 20 | <u>2.5</u> | 26 | 200 | 5 | 450 | 300 | Comparative Example |
| 18 | A | 855 | 180 | 5 | 30.0 | 10 | 250 | 5 | 400 | 800 | Example |
| 19 | A | 820 | 180 | 10 | 60.0 | 10 | 200 | 5 | 400 | 800 | Example |
| 20 | A | 820 | 180 | 10 | 18.0 | 10 | 200 | 5 | 400 | 800 | Example |
| 21 | A | 820 | 180 | 10 | <u>10.0</u> | 10 | 200 | 5 | 400 | 800 | Comparative Example |
| 22 | A | 820 | 180 | 25 | 32.0 | 20 | <u>330</u> | 10 | 400 | 800 | Comparative Example |
| 23 | A | 820 | 180 | 10 | 28.0 | 10 | 200 | 5 | <u>560</u> | 800 | Comparative Example |
| 24 | A | 820 | 180 | 10 | 32.0 | 10 | 200 | 5 | 330 | 800 | Example |
| 44 | A | 820 | 180 | 10 | 32.0 | 10 | 200 | 5 | <u>280</u> | 800 | Comparative Example |
| 25 | A | 820 | 180 | 10 | 32.0 | 10 | 200 | 5 | 400 | 40 | Example |
| 45 | A | 820 | 180 | 10 | 32.0 | 10 | 200 | 5 | 400 | <u>20</u> | Comparative Example |
| 26 | C | 830 | 150 | 20 | 45.0 | 10 | 210 | 10 | 390 | 600 | Example |
| 27 | C | 845 | 150 | 20 | 45.0 | 10 | 205 | 10 | 410 | 600 | Example |
| 28 | D | 820 | 180 | 15 | 50.0 | 5 | 200 | 20 | 380 | 1000 | Example |
| 46 | D | 820 | 180 | 15 | 50.0 | 5 | 200 | 20 | 330 | 1000 | Example |
| 47 | D | 840 | 180 | 5 | 50.0 | 5 | 200 | 20 | 380 | 1000 | Example |
| 29 | E | 830 | 240 | 15 | 35.0 | 6 | 210 | 10 | 410 | 800 | Example |
| 30 | E | 840 | 240 | 20 | 37.0 | 6 | 205 | 10 | 400 | 800 | Example |
| 31 | G | 820 | 220 | 10 | 18.0 | 10 | 200 | 10 | 450 | 180 | Example |
| 32 | <u>H</u> | 800 | 200 | 10 | 30.0 | 10 | 200 | 10 | 400 | 800 | Comparative Example |
| 33 | <u>I</u> | 820 | 240 | 10 | 25.0 | 10 | 200 | 10 | 400 | 600 | Comparative Example |
| 34 | <u>J</u> | 800 | 220 | 20 | 35.0 | 10 | 200 | 10 | 400 | 600 | Comparative Example |
| 35 | <u>K</u> | 785 | 220 | 7 | 35.0 | 5 | 190 | 10 | 400 | 600 | Comparative Example |
| 36 | <u>L</u> | 830 | 180 | 15 | 30.0 | 10 | 200 | 10 | 400 | 800 | Comparative Example |
| 37 | M | 810 | 180 | 8 | 18.0 | 7 | 195 | 6 | 400 | 800 | Example |
| 38 | N | 820 | 180 | 15 | 37.0 | 8 | 210 | 6 | 400 | 800 | Example |
| 39 | O | 830 | 220 | 20 | 40.0 | 10 | 180 | 10 | 400 | 600 | Example |
| 40 | P | 850 | 200 | 20 | 40.0 | 10 | 180 | 10 | 400 | 600 | Example |
| 41 | Q | 840 | 210 | 20 | 40.0 | 7 | 190 | 10 | 400 | 600 | Example |
| 42 | R | 840 | 200 | 20 | 25.0 | 7 | 200 | 10 | 420 | 800 | Example |
| 43 | S | 820 | 180 | 20 | 50.0 | 7 | 200 | 10 | 400 | 600 | Example |

*Underlines indicate the outside of the scope of the present invention.
*1 Average cooling rate in temperature range of 780° C. to 470° C.
*2 Holding time in temperature range of 470° C. to 405° C.
*3 Average cooling rate in temperature range of 405° C. to cooling stop temperature (Tsq) represented by formula (A) (when cooling is stopped at a temperature higher than Tsq, average cooling rate in temperature range of 405° C. to a temperature at which cooling is stopped)
*4 Average heating rate in temperature range of cooling stop temperature to 370° C.
*5 Holding time in temperature range of 300° C. to 550° C.

TABLE 2-2

| | | Microstructure | | | | | | | | Properties | | | | |
|---|---|---|---|---|---|---|---|---|---|---|---|---|---|---|
| No. | Steel number | Area ratio of ferrite (%) | Area ratio of the remainder*6 (%) | Volume ratio of retained γ (%) | $S_{\gamma UB}$ (%) | $S_{C\text{-}enriched}$ (%) | $S_{\gamma Block}$ (%) | $N_{MA}/N_P$ | $Mn_{\gamma 2nd}/Mn_{Bulk}$ | TS (MPa) | U. El (%) | λ (%) | (TS × U. El-7000) × λ | Note |
| 1 | A | 10 | 90 | 12.0 | 0.4 | 0.4 | 0 | 0.1 | 1.2 | 1220 | 12.0 | 52 | 397280 | Example |
| 2 | A | 0 | 100 | 9.0 | 0.4 | 0.4 | 0 | 0.2 | 1.0 | 1210 | 10.4 | 50 | 279200 | Comparative Example |
| 3 | A | 12 | 88 | 11.2 | 0.3 | 0.3 | 4 | 0.7 | 1.2 | 1205 | 13.0 | 38 | 329270 | Comparative Example |
| 4 | A | 10 | 90 | 10.8 | 0.2 | 0.2 | 0 | 0.0 | 1.2 | 1230 | 10.0 | 55 | 291500 | Example |
| 5 | A | 10 | 90 | 9.8 | 0.0 | 0.0 | 0 | 0.0 | 1.2 | 1260 | 9.5 | 55 | 273350 | Comparative Example |
| 6 | A | 10 | 90 | 9.0 | 0.0 | 0.0 | 0 | 0.0 | 1.2 | 1270 | 8.0 | 62 | 195920 | Comparative Example |
| 7 | A | 10 | 90 | 11.0 | 0.3 | 0.3 | 4 | 0.1 | 1.2 | 1190 | 13.0 | 37 | 313390 | Comparative Example |
| 8 | A | 10 | 90 | 11.0 | 0.6 | 0.6 | 5 | 0.0 | 1.2 | 1185 | 13.0 | 38 | 319390 | Comparative Example |
| 9 | A | 10 | 90 | 12.0 | 0.5 | 0.5 | 1 | 0.0 | 1.2 | 1220 | 13.0 | 50 | 443000 | Example |
| 10 | A | 10 | 90 | 10.0 | 0.2 | 0.1 | 10 | 0.0 | 1.2 | 1250 | 12.0 | 29 | 232000 | Comparative Example |
| 11 | A | 10 | 90 | 12.5 | 1.0 | 1.0 | 0 | 0.0 | 1.2 | 1230 | 12.0 | 55 | 426800 | Example |
| 12 | A | 10 | 90 | 10.0 | 0.3 | 0.3 | 4 | 0.0 | 1.2 | 1250 | 10.7 | 39 | 248625 | Comparative Example |
| 13 | A | 10 | 90 | 12.0 | 0.4 | 0.4 | 0 | 0.0 | 1.2 | 1220 | 12.2 | 52 | 409968 | Example |
| 14 | A | 10 | 90 | 7.0 | 0.1 | 0.1 | 0 | 0.0 | 1.2 | 1220 | 8.0 | 52 | 143520 | Comparative Example |
| 15 | B | 18 | 82 | 10.0 | 0.3 | 0.3 | 5 | 1.0 | 1.2 | 1180 | 9.0 | 38 | 137560 | Comparative Example |
| 16 | B | 18 | 82 | 10.0 | 0.5 | 0.5 | 5 | 1.5 | 1.2 | 1195 | 10.0 | 38 | 188100 | Comparative Example |
| 17 | B | 18 | 82 | 10.0 | 0.5 | 0.5 | 5 | 1.0 | 1.2 | 1195 | 8.0 | 45 | 115200 | Comparative Example |
| 18 | A | 6 | 94 | 9.0 | 0.4 | 0.4 | 3 | 0.7 | 1.0 | 1218 | 11.7 | 40 | 290024 | Example |
| 19 | A | 10 | 90 | 12.2 | 0.8 | 0.7 | 1 | 0.1 | 1.2 | 1217 | 12.2 | 51 | 400217 | Example |
| 20 | A | 10 | 90 | 11.5 | 0.3 | 0.3 | 0 | 0.0 | 1.2 | 1220 | 11.0 | 52 | 333840 | Example |
| 21 | A | 10 | 90 | 10.2 | 0.1 | 0.1 | 0 | 0.0 | 1.2 | 1250 | 9.6 | 55 | 275000 | Comparative Example |
| 22 | A | 10 | 90 | 11.0 | 5.0 | 5.0 | 45 | 3.5 | 1.2 | 1410 | 9.0 | 8 | 45520 | Comparative Example |
| 23 | A | 11 | 89 | 6.0 | 0.1 | 0.1 | 2 | 0.1 | 1.2 | 1185 | 7.4 | 48 | 84912 | Comparative Example |
| 24 | A | 10 | 90 | 7.0 | 0.4 | 0.1 | 0 | 0.1 | 1.2 | 1266 | 9.0 | 66 | 290004 | Example |
| 44 | A | 10 | 90 | 6.0 | 0.4 | 0.0 | 0 | 0.1 | 1.2 | 1285 | 8.0 | 68 | 223040 | Comparative Example |
| 25 | A | 10 | 90 | 7.0 | 0.4 | 0.1 | 0 | 0.1 | 1.2 | 1277 | 9.4 | 58 | 290220 | Example |
| 45 | A | 10 | 90 | 5.0 | 0.4 | 0.0 | 0 | 0.1 | 1.2 | 1275 | 8.4 | 50 | 185500 | Comparative Example |
| 26 | C | 13 | 87 | 15.2 | 2.6 | 2.5 | 3 | 0.0 | 1.2 | 1200 | 16.0 | 40 | 488000 | Example |
| 27 | C | 6 | 94 | 13.8 | 3.4 | 3.2 | 0 | 0.0 | 1.2 | 1205 | 13.8 | 54 | 519966 | Example |
| 28 | D | 6 | 94 | 14.0 | 0.5 | 0.5 | 0 | 0.0 | 1.2 | 1335 | 10.0 | 39 | 247650 | Example |
| 46 | D | 6 | 94 | 8.0 | 0.5 | 0.1 | 0 | 0.0 | 1.2 | 1350 | 8.4 | 48 | 208320 | Example |
| 47 | D | 6 | 94 | 12.0 | 0.5 | 0.5 | 0 | 0.0 | 1.0 | 1410 | 9.5 | 32 | 204640 | Example |
| 29 | E | 50 | 50 | 11.0 | 0.3 | 0.3 | 3 | 0.0 | 1.2 | 1040 | 15.3 | 46 | 409952 | Example |
| 30 | E | 33 | 67 | 9.0 | 0.6 | 0.6 | 0 | 0.0 | 1.2 | 1035 | 11.8 | 67 | 349271 | Example |
| 31 | G | 67 | 33 | 7.0 | 0.3 | 0.3 | 1 | 0.0 | 1.3 | 820 | 15.4 | 70 | 393960 | Example |
| 32 | H | 8 | 92 | 7.0 | 0.0 | 0.0 | 5 | 0.0 | 1.2 | 1450 | 10.0 | 24 | 180000 | Comparative Example |
| 33 | I | 85 | 15 | 5.0 | 0.1 | 0.1 | 1 | 0.0 | 1.3 | 710 | 16.0 | 80 | 348800 | Comparative Example |
| 34 | J | 35 | 65 | 6.0 | 1.2 | 1.2 | 0 | 0.0 | 1.2 | 1025 | 9.0 | 70 | 155750 | Comparative Example |
| 35 | K | 6 | 94 | 21.0 | 0.0 | 0.0 | 27 | 0.0 | 1.2 | 1298 | 13.0 | 12 | 118488 | Comparative Example |
| 36 | L | 52 | 48 | 13.0 | 0.0 | 0.0 | 9 | 1.5 | 1.1 | 990 | 13.0 | 29 | 170230 | Comparative Example |
| 37 | M | 45 | 55 | 7.0 | 0.3 | 0.3 | 1 | 0.0 | 1.2 | 1050 | 10.1 | 83 | 299215 | Example |
| 38 | N | 45 | 55 | 10.0 | 0.5 | 0.5 | 2 | 0.0 | 1.2 | 1040 | 11.0 | 70 | 310800 | Example |
| 39 | O | 40 | 60 | 9.0 | 1.5 | 1.4 | 3 | 0.1 | 1.2 | 1050 | 10.8 | 69 | 299460 | Example |
| 40 | P | 40 | 60 | 10.0 | 1.5 | 1.4 | 2 | 0.1 | 1.2 | 1040 | 11.6 | 65 | 329160 | Example |
| 41 | Q | 12 | 88 | 11.0 | 1.2 | 1.2 | 1 | 0.0 | 1.2 | 1220 | 10.8 | 49 | 302624 | Example |

TABLE 2-2-continued

| | | Microstructure | | | | | | | | Properties | | | | |
|---|---|---|---|---|---|---|---|---|---|---|---|---|---|---|
| No. | Steel number | Area ratio of ferrite (%) | Area ratio of the remainder*6 (%) | Volume ratio of retained γ (%) | $S_{\gamma UB}$ (%) | $S_{C\text{-}enriched}$ (%) | $S_{\gamma Block}$ (%) | $N_{MA}/N_P$ | $Mn_{\gamma 2nd}/Mn_{Bulk}$ | TS (MPa) | U. El (%) | λ (%) | (TS × U. El − 7000) × λ | Note |
| 42 | R | 10 | 90 | 11.0 | 1.0 | 1.0 | 0 | 0.0 | 1.2 | 1210 | 11.2 | 48 | 314496 | Example |
| 43 | S | 12 | 88 | 12.0 | 0.3 | 0.3 | 2 | 0.0 | 1.2 | 1227 | 10.8 | 48 | 300077 | Example |

*Underlines indicate the outside of the scope of the present invention.
*6Microstructure composed of one or two or more of upper bainite, fresh martensite, tempered martensite, lower bainite, and retained γ

INDUSTRIAL APPLICABILITY

Aspects of the present invention are suitably applicable to a steel sheet for press forming for use in automobiles, home appliances, and the like through a press forming step, the steel sheet having extremely high ductility and excellent stretch flangeability.

The invention claimed is:

1. A steel sheet having a component composition containing, in mass %,
C: 0.06 to 0.25%,
Si: 0.6 to 2.5%,
Mn: 2.3 to 3.5%,
P: 0.02% or less,
S: 0.01% or less,
sol. Al: less than 0.50%, and
N: less than 0.015%,
with the balance being iron and incidental impurities,
the steel sheet containing, in percent area, 6 to 80% of ferrite and 20 to 94% of a microstructure composed of one or two or more of upper bainite, fresh martensite, tempered martensite, lower bainite, and retained γ, and containing, in percent volume, 7 to 20% of retained γ, wherein: a percent area ($S_{\gamma UB}$) of retained γUB having a particle width of 0.18 to 0.60 μm, a particle length of 1.7 to 7.0 μm, and an aspect ratio of 5 to 15 is 0.2 to 5%; and a total percent area ($S_{\gamma Block}$) of fresh martensite having an equivalent circle diameter of 1.5 to 15 μm and an aspect ratio of 3 or less and/or retained γ particles having an equivalent circle diameter of 1.5 to 15 μm and an aspect ratio of 3 or less is 3% or less (including 0%),
wherein $\gamma_{UB}$ refers to plate-like retained austenite, γ, adjacent to upper bainite,
wherein the steel sheet has a TS of 780 MPa or higher, and when the TS is 780 to 1,319 MPa, the expression:
[(TS×U.El)−7,000]×λ≥290,000 MPa % is satisfied, and when the TS is 1,320 MPa or higher, the expression:
[(TS×U.El)−7,000]×λ≥200,000 MPa % is satisfied, and wherein the tensile strength (TS) and the uniform elongation (U.El) are measured in accordance with standard JIS Z 2241 and the hole expansion ratio (λ) is measured in accordance with standard JFS T 1001.

2. The steel sheet according to claim 1, wherein a ratio ($N_{MA}/N_P$) of a total number ($N_{MA}$) of fresh martensite having an aspect ratio of 3 or less and an equivalent circle diameter of 0.15 to 1.9 μm and/or retained γ particles having an aspect ratio of 3 or less and an equivalent circle diameter of 0.15 to 1.9 μm, the fresh martensite and the retained γ particles being distributed inside polygonal ferrite, to a total number ($N_P$) of polygonal ferrite grains is 0.3 or less.

3. The steel sheet according to claim 1,
wherein the steel sheet has at least one of the following groups A, B and C:
Group A:
a total percent area ($S_{C\text{-}enriched}$) of a region, whose adjacent region has a C concentration of 0.07% or less, having a C concentration of 0.7 to 1.3% is 0.2 to 5% in the microstructure,
Group B:
total percent area ratio ($S_{C\text{-}enriched}$) of a region, whose adjacent region has a C concentration of 0.07% or less, having a C concentration of 0.7 to 1.3% is 0.2 to 5% in the microstructure, and the microstructure has at least one of the following (i) and (ii):
(i): the region is composed of retained γ or retained γUB particles,
(ii): the adjacent region contains upper bainite,
Group C:
a ratio ($Mn_{\gamma 2nd}/Mn_{Bulk}$) of a Mn concentration ($Mn_{\gamma 2nd}$) in a region composed of upper bainite, fresh martensite, tempered martensite, lower bainite, and retained γ, which are the remainder excluding polygonal ferrite, to an average Mn concentration ($Mn_{Bulk}$) in the steel sheet is 1.1 or more.

4. The steel sheet according to claim 2,
wherein the steel sheet has at least one of the following groups A, B and C:
Group A:
a total percent area ($S_{C\text{-}enriched}$) of a region, whose adjacent region has a C concentration of 0.07% or less, having a C concentration of 0.7 to 1.3% is 0.2 to 5% in the microstructure,
Group B:
a total percent area ($S_{C\text{-}enriched}$) of a region, whose adjacent region has a C concentration of 0.07% or less, having a C concentration of 0.7 to 1.3% is 0.2 to 5% in the microstructure, and the microstructure has at least one of the following (i) and (ii):
(i): the region is composed of retained γ or retained γUB particles,
(ii): the adjacent region contains upper bainite,
Group C:
a ratio ($Mn_{\gamma 2nd}/Mn_{Bulk}$) of a Mn concentration ($Mn_{\gamma 2nd}$) in a region composed of upper bainite, fresh martensite, tempered martensite, lower bainite, and retained γ, which are the remainder excluding polygonal ferrite, to an average Mn concentration ($Mn_{Bulk}$) in the steel sheet is 1.1 or more.

5. The steel sheet according to claim 1,
wherein the component composition further contains, in mass %, at least one of the following groups D to F:

Group D:
  one or two selected from:
    Ti: 0.002 to 0.1% and
    B: 0.0002 to 0.01%, Group E:
  one or two or more selected from:
    Cu: 0.005 to 1%,
    Ni: 0.01 to 1%,
    Cr: 0.01 to 1.0%,
    Mo: 0.01 to 0.5%,
    V: 0.003 to 0.5%,
    Nb: 0.002 to 0.1%,
    Zr: 0.005 to 0.2%, and
    W: 0.005 to 0.2%, Group F:
  one or two or more selected from:
    Ca: 0.0002 to 0.0040%,
    Ce: 0.0002 to 0.0040%,
    La: 0.0002 to 0.0040%,
    Mg: 0.0002 to 0.0030%,
    Sb: 0.002 to 0.1%, and
    Sn: 0.002 to 0.1%.

6. The steel sheet according to claim 2, wherein the component composition further contains, in mass %, at least one of the following groups D to F:

Group D:
  one or two selected from:
    Ti: 0.002 to 0.1% and B: 0.0002 to 0.01%, Group E:
  one or two or more selected from:
    Cu: 0.005 to 1%,
    Ni: 0.01 to 1%,
    Cr: 0.01 to 1.0%,
    Mo: 0.01 to 0.5%,
    V: 0.003 to 0.5%,
    Nb: 0.002 to 0.1%,
    Zr: 0.005 to 0.2%, and
    W: 0.005 to 0.2%, Group F:
  one or two or more selected from:
    Ca: 0.0002 to 0.0040%,
    Ce: 0.0002 to 0.0040%,
    La: 0.0002 to 0.0040%,
    Mg: 0.0002 to 0.0030%,
    Sb: 0.002 to 0.1%, and
    Sn: 0.002 to 0.1%.

7. The steel sheet according to claim 3, wherein the component composition further contains, in mass %, at least one of the following groups D to F:

Group D:
  one or two selected from:
    Ti: 0.002 to 0.1% and
    B: 0.0002 to 0.01%, Group E:
  one or two or more selected from:
    Cu: 0.005 to 1%,
    Ni: 0.01 to 1%,
    Cr: 0.01 to 1.0%,
    Mo: 0.01 to 0.5%,
    V: 0.003 to 0.5%,
    Nb: 0.002 to 0.1%,
    Zr: 0.005 to 0.2%, and
    W: 0.005 to 0.2%, Group F:
  one or two or more selected from:
    Ca: 0.0002 to 0.0040%,
    Ce: 0.0002 to 0.0040%,
    La: 0.0002 to 0.0040%,
    Mg: 0.0002 to 0.0030%,
    Sb: 0.002 to 0.1%, and
    Sn: 0.002 to 0.1%.

8. The steel sheet according to claim 4, wherein the component composition further contains, in mass %, at least one of the following groups D to F:

Group D:
  one or two selected from:
    Ti: 0.002 to 0.1% and
    B: 0.0002 to 0.01%, Group E:
  one or two or more selected from:
    Cu: 0.005 to 1%,
    Ni: 0.01 to 1%,
    Cr: 0.01 to 1.0%,
    Mo: 0.01 to 0.5%,
    V: 0.003 to 0.5%,
    Nb: 0.002 to 0.1%,
    Zr: 0.005 to 0.2%, and
    W: 0.005 to 0.2%, Group F:
  one or two or more selected from:
    Ca: 0.0002 to 0.0040%,
    Ce: 0.0002 to 0.0040%,
    La: 0.0002 to 0.0040%,
    Mg: 0.0002 to 0.0030%,
    Sb: 0.002 to 0.1%, and
    Sn: 0.002 to 0.1%.

9. The steel sheet according to claim 1, wherein the tensile strength is 780 MPa or higher and 1,450 MPa or lower.

10. The steel sheet according to claim 2, wherein the tensile strength is 780 MPa or higher and 1,450 MPa or lower.

11. The steel sheet according to claim 3, wherein the tensile strength is 780 MPa or higher and 1,450 MPa or lower.

12. The steel sheet according to claim 4, wherein the tensile strength is 780 MPa or higher and 1,450 MPa or lower.

13. The steel sheet according to claim 5, wherein the tensile strength is 780 MPa or higher and 1,450 MPa or lower.

14. The steel sheet according to claim 6, wherein the tensile strength is 780 MPa or higher and 1,450 MPa or lower.

15. The steel sheet according to claim 7, wherein the tensile strength is 780 MPa or higher and 1,450 MPa or lower.

16. The steel sheet according to claim 8, wherein the tensile strength is 780 MPa or higher and 1,450 MPa or lower.

17. A manufacturing method for a steel sheet according to claim 1 comprising: hot rolling and cold rolling a steel slab having the component composition according to claim 1: annealing the resulting cold-rolled steel sheet on a continuous annealing line (CAL) at an annealing temperature of 780° C. to 880° C.; cooling at an average cooling rate of 5.0° C./s to 2,000° C./s in a temperature range of 780° C. to 470° C.; holding at a temperature range of 470° C. to 405° C. for 14 to 200 sec; cooling at an average cooling rate of 5.0° C./s to 80° C./s in a temperature range from 405° C. to a cooling stop temperature (Tsq) represented by a formula (A); heating at an average heating rate of 3° C./s or more in a temperature range from the cooling stop temperature to 370° C.; holding at 300° C. to 550° C. for 30 to 3,000 sec; and cooling to room temperature, wherein the cooling stop temperature Tsq (° C.) is $$\text{Ms}-90 \geq \text{Tsq} \geq \text{Ms}-180 \quad (A)$$

$$\text{Ms}=539-474\times[\% \text{ C}]/(100-V_F)\times100-30.4\times[\% \text{ Mn}]\times1.2-12.1\times[\% \text{ Cr}]-7.5\times[\% \text{ Mo}]-17.7\times[\% \text{ Ni}] \quad (B)$$

where [% C], [% Mn], [% Cr], [% Mo], and [% Ni] represent the content (mass %) of C, Mn, Cr, Mo, and Ni, respectively, or 0 if not contained, and $V_F$ represents a percent area (%) of ferrite.

18. A manufacturing method for a steel sheet according to claim 5 comprising: hot rolling and cold rolling a steel slab having the component composition according to claim 5; annealing the resulting cold-rolled steel sheet on a continuous annealing line (CAL) at an annealing temperature of 780° C. to 880° C.; cooling at an average cooling rate of 5.0° C./s to 2,000° C./s in a temperature range of 780° C. to 470° C.; holding at a temperature range of 470° C. to 405° C. for 14 to 200 sec; cooling at an average cooling rate of 5.0° C./s to 80° C./s in a temperature range from 405° C. to a cooling stop temperature (Tsq) represented by a formula (A); heating at an average heating rate of 3° C./s or more in a temperature range from the cooling stop temperature to 370° C.; holding at 300° C. to 550° C. for 30 to 3,000 sec; and cooling to room temperature, wherein the cooling stop temperature Tsq (° C.) is $$\text{Ms}-90 \geq \text{Tsq} \geq \text{Ms}-180 \quad (A)$$

$$\text{Ms}=539-474\times[\% \text{ C}]/(100-V_F)\times100-30.4\times[\% \text{ Mn}]\times1.2-12.1\times[\% \text{ Cr}]-7.5\times[\% \text{ Mo}]-17.7\times[\% \text{ Ni}] \quad (B)$$

where [% C], [% Mn], [% Cr], [% Mo], and [% Ni] represent the content (mass %) of C, Mn, Cr, Mo, and Ni, respectively, or 0 if not contained, and $V_F$ represents a percent area (%) of ferrite.

* * * * *

UNITED STATES PATENT AND TRADEMARK OFFICE
CERTIFICATE OF CORRECTION

PATENT NO. : 11,390,930 B2
APPLICATION NO. : 16/604398
DATED : July 19, 2022
INVENTOR(S) : Yoshihiko Ono et al.

It is certified that error appears in the above-identified patent and that said Letters Patent is hereby corrected as shown below:

In the Claims

In Column 27, Claim 1, Line 39, "retained y" should read -- retained $\gamma$ --

In Column 27, Claim 1, Line 40, "retained $\gamma$UB" should read -- retained $\gamma_{UB}$ --

In Column 27, Claim 1, Line 49, "$y_{UB}$ refers" should read -- $\gamma_{UB}$ refers --

In Column 27, Claim 1, Line 49, "austenite, y" should read -- austenite, $\gamma$ --

In Column 27, Claim 1, Line 53, "MPa %" should read -- MPa·% --

In Column 27, Claim 1, Line 55, "MPa %" should read -- MPa·% --

In Column 28, Claim 3, Line 30, "retained $\gamma$UB" should read -- retained $\gamma_{UB}$ --

In Column 28, Claim 4, Line 55, "retained $\gamma$UB" should read -- retained $\gamma_{UB}$ --

Signed and Sealed this
Eighteenth Day of October, 2022

Katherine Kelly Vidal
*Director of the United States Patent and Trademark Office*